US011416024B2

(12) United States Patent
Bryant

(10) Patent No.: US 11,416,024 B2
(45) Date of Patent: Aug. 16, 2022

(54) SUPPLEMENTAL COMPUTING DISPLAY ASSEMBLY FOR PORTABLE COMPUTING DEVICES

(71) Applicant: Aaron Bryant, Dix Hills, NY (US)

(72) Inventor: Aaron Bryant, Dix Hills, NY (US)

( * ) Notice: Subject to any disclaimer, the term of this patent is extended or adjusted under 35 U.S.C. 154(b) by 72 days.

(21) Appl. No.: 17/023,698

(22) Filed: Sep. 17, 2020

(65) Prior Publication Data
US 2021/0080999 A1 Mar. 18, 2021

Related U.S. Application Data

(60) Provisional application No. 62/901,985, filed on Sep. 18, 2019.

(51) Int. Cl.
*G06F 1/16* (2006.01)
*F16M 13/00* (2006.01)
*G06F 3/14* (2006.01)

(52) U.S. Cl.
CPC ......... *G06F 1/1618* (2013.01); *F16M 13/005* (2013.01); *G06F 1/1632* (2013.01); *G06F 1/1647* (2013.01); *G06F 3/1446* (2013.01)

(58) Field of Classification Search
CPC .............................. G06F 1/166; G06F 1/1632
See application file for complete search history.

(56) References Cited

U.S. PATENT DOCUMENTS

| | | | | |
|---|---|---|---|---|
| 5,292,099 A * | 3/1994 | Isham | ................... | A47B 21/045 248/278.1 |
| 5,768,096 A * | 6/1998 | Williams | ............... | G06F 1/1616 361/679.04 |
| 6,151,401 A * | 11/2000 | Annaratone | .......... | G06F 1/1616 361/679.23 |
| 6,222,507 B1 * | 4/2001 | Gouko | ................... | G06F 1/1601 345/1.1 |
| 6,256,193 B1 * | 7/2001 | Janik | .................... | A47B 23/043 248/922 |
| 6,343,006 B1 * | 1/2002 | Moscovitch | .......... | G06F 1/1601 361/679.04 |
| 6,532,146 B1 * | 3/2003 | Duquette | .............. | G06F 1/1607 361/679.04 |

(Continued)

FOREIGN PATENT DOCUMENTS

JP 2007241962 A 9/2007

*Primary Examiner* — Adrian S Wilson
(74) *Attorney, Agent, or Firm* — Carter, DeLuca & Farrell LLP; George Likourezos

(57) ABSTRACT

A supplemental computing display assembly is selectively attachable to a portable computing device having a first display. The supplemental computing display assembly includes: a main housing configured for selective attachment to the portable computing device, a first arm assembly secured to the main housing, and a second display assembly operatively coupled to the first arm assembly. The second display assembly includes a second display configured to communicate with the portable computing device and is positionable adjacent to the first display to act as an additional display for the portable computing device when the main housing is attached to the portable computing device. The second display is selectively movable relative to the main housing between a landscape orientation and a portrait orientation.

20 Claims, 29 Drawing Sheets

(56) References Cited

U.S. PATENT DOCUMENTS

| | | | |
|---|---|---|---|
| 6,643,127 B1 * | 11/2003 | Richardson | G06F 1/1632 312/223.4 |
| 6,778,383 B2 | 8/2004 | Ho | |
| 6,859,219 B1 * | 2/2005 | Sall | G06F 1/1607 345/1.1 |
| 7,016,181 B2 * | 3/2006 | Ito | G06F 1/1626 248/122.1 |
| 7,061,754 B2 * | 6/2006 | Moscovitch | F16M 11/10 248/917 |
| 7,091,926 B2 * | 8/2006 | Kulas | G06F 3/1446 345/1.1 |
| 7,375,954 B2 * | 5/2008 | Yang | G06F 1/1616 248/920 |
| D630,206 S | 1/2011 | Kovac | |
| 8,000,090 B2 * | 8/2011 | Moscovitch | F16M 11/2064 361/679.04 |
| 8,018,715 B2 * | 9/2011 | Chang | G06F 1/1624 361/679.04 |
| 8,243,471 B2 * | 8/2012 | Liang | G06F 1/1603 361/829 |
| 8,462,103 B1 * | 6/2013 | Moscovitch | G06F 1/1601 345/156 |
| 8,473,853 B2 * | 6/2013 | Gage | G06F 3/0488 715/761 |
| 8,488,306 B2 * | 7/2013 | Mickey | F16M 13/022 361/679.04 |
| 8,854,278 B2 * | 10/2014 | Parker | G06F 3/1431 345/1.1 |
| 9,164,538 B2 * | 10/2015 | Moscovitch | G06F 1/1601 |
| 9,207,722 B2 * | 12/2015 | Ergun | G06F 1/1632 |
| D761,800 S * | 7/2016 | Muller | D14/448 |
| 9,395,757 B2 * | 7/2016 | Relf | G06F 1/1647 |
| 9,441,782 B2 * | 9/2016 | Funk | F16M 13/02 |
| 10,871,801 B2 * | 12/2020 | Yao | G06F 1/1679 |
| 11,209,869 B2 * | 12/2021 | Hudgins | G06F 1/1647 |
| 2003/0043087 A1 * | 3/2003 | Kim | G06F 1/1641 345/1.1 |
| 2003/0222149 A1 * | 12/2003 | Solomon | G06F 1/1669 235/472.01 |
| 2008/0316176 A1 * | 12/2008 | Deutsch | G06F 1/169 345/168 |
| 2013/0092805 A1 * | 4/2013 | Funk | F16M 13/00 248/121 |
| 2013/0279106 A1 * | 10/2013 | Ergun | F16M 11/24 361/679.26 |
| 2014/0254077 A1 * | 9/2014 | Griffin | G06F 1/1675 361/679.08 |

* cited by examiner

SUPPLEMENTAL COMPUTING DISPLAY ASSEMBLY FOR PORTABLE COMPUTING DEVICES

CROSS REFERENCE TO RELATED APPLICATIONS

This application claims the benefit of U.S. Provisional Patent Application Ser. No. 62/901,985, filed on Sep. 18, 2019, the entire contents of which are incorporated by reference herein.

FIELD

The present disclosure relates to electronic enhancements for portable computing devices such as laptops or tablets.

BACKGROUND

As more and more tasks are performed using a single desktop computer, a computer display can become cluttered because of the number of applications open for use at any given time. Additionally, with the limited available desktop space, a user may need to place application windows on top of one another with the currently used application window at the forefront of the display to facilitate the application's use. The limited size of the display limits the amount of information that can be displayed at any given time. As can be imagined, it would be more convenient in some applications to allow for more display space. For example, where a user references a document while creating a different document in a different application, the user may wish to have both applications available for use simultaneously as the document being created may have a need to include information from the referenced document.

Thus, developments in systems for connecting monitors to a portable computing device are needed.

SUMMARY

In accordance with aspects of the disclosure, a supplemental computing display assembly for selective attachment to a portable computing device having a first display is presented. The supplemental computing display assembly includes a main housing configured for selective attachment to the portable computing device, a first arm assembly secured to the main housing, and a second display assembly operatively coupled to the first arm assembly. The second display assembly includes a second display configured to communicate with the portable computing device, the second display positionable adjacent to the first display to act as an additional display for the portable computing device when the main housing is attached to the portable computing device. The second display is selectively movable relative to the main housing between a landscape orientation and a portrait orientation.

In an aspect of the present disclosure, the supplemental computing display assembly may further include a second arm assembly secured to the main housing and a third display assembly operatively coupled to the second arm assembly and including a third display configured to communicate with the portable computing device, the third display positionable adjacent to the first display to act as a third additional display for the portable computing device when the main housing is attached to the portable computing device. The third display may be selectively movable relative to the main housing between a landscape orientation and a portrait orientation, independently from the second display assembly.

In another aspect of the present disclosure, the second display assembly is extended and positioned in a portrait orientation, when the third display assembly is extended and positioned in a landscape orientation.

In yet another aspect of the present disclosure, the main housing may include a first coupler assembly. The second display assembly may include a display housing configured to house the second display. The display housing may include a second coupler assembly configured to couple to a pushpin of a second coupler assembly.

In a further aspect of the present disclosure, the first coupler assembly may include a push pin receptacle configured to receive the pushpin, a spring clip configured to hold the coupled push pin in place, and a spring clip retainer configured to retain the spring clip.

In yet a further aspect of the present disclosure, the first arm assembly may include a pivot joint configured for orienting the first display between a landscape orientation and a portrait orientation. The pivot joint may include a pivot joint column configured to slidably engage the display assembly, a spring washer configured to hold the pivot joint within a pivot joint slot of the second display assembly, and a retainer head coupled to the pivot joint column and configured to retain the pivot joint column within the pivot joint slot.

In an aspect of the present disclosure, the first arm assembly may be configured to extend or retract the second display assembly from the display housing.

In another aspect of the present disclosure, the supplemental computing display assembly may further include a kickstand.

In yet another aspect of the present disclosure, the supplemental computing display assembly may further include an accessory assembly coupled to the main housing and/or the display housing.

In a further aspect of the present disclosure, the accessory assembly may include a battery configured to power the second display.

In yet a further aspect of the present disclosure, the accessory assembly may include a USB hub.

In an aspect of the present disclosure, the first housing assembly may include a display housing rail system.

In another aspect of the present disclosure, the supplemental computing display assembly may further include a hinge assembly operatively coupled to the second display assembly. The hinge assembly may be configured to travel along the display housing rail system.

In yet another aspect of the present disclosure, the hinge assembly is configured to enable the second display assembly to rotate up to about 90-degrees in a forward direction, and up to about 180-degrees in a rearward direction.

In a further aspect of the present disclosure, the second display assembly may further define a recess along a horizontal edge of the second display assembly. The recess may be configured to slidably receive the display house rail system. The arm assembly may be configured to align with the horizontal edge.

In accordance with aspects of the disclosure, a supplemental computing display assembly for selective attachment to a portable computing device having a first display is presented. The supplemental computing display assembly includes a main housing configured for selective attachment to the portable computing device and two display assemblies operatively coupled to the main housing via the respective hinge assembly. The main housing includes a first coupling arm tab and two hinge assemblies. The first coupling arm tab is configured to mechanically attach the main housing to the portable computing device.

In an aspect of the present disclosure, the supplemental computing display assembly may further include a kickstand operatively coupled to the main housing. The kickstand is moveable between an open position and a closed position.

In an aspect of the present disclosure, the main housing may further include a second coupling arm tab. A gear assembly is configured to synchronize movement of the first and second coupling arm tabs.

In another aspect of the present disclosure, a first display assembly of the at least two display assemblies may be extended and positioned in a portrait orientation, while a second display assembly of the at least two display assemblies is extended and positioned in a landscape orientation.

In yet another aspect of the present disclosure, the supplemental computing display assembly may further include at least two coupling arms configured to operably couple the at least two display assemblies to the main housing.

BRIEF DESCRIPTION OF THE DRAWINGS

Various aspects of the present disclosure are described hereinbelow with references to the drawings, wherein.

DETAILED DESCRIPTION OF THE DRAWINGS

In accordance with the present disclosure, a supplemental computing display assembly is presented, as illustrated in the attached figures and photos. The assembly may be comprised of a number of different integral components. The supplemental computing display assembly may include but is not limited to, a main housing, arms, a rail system, a gear assembly, coupling arms, a first display assembly, a second display assembly, and a kickstand. The components of the supplemental computing display assembly may be manufactured from plastics, metals, alloys, polyurethane, wood, bamboo, composite materials, or any other suitable materials known to one of skill in the art.

The terms "monitor" and "display" are used interchangeably herein to refer to an output device configured to couple to a computing device such as a personal computer, laptop, tablet, etc.

As used herein, the terms "front" and "forward" refer to that portion that would face or be nearer a user of a portable computing device coupled to the supplemental computing display assembly, and the terms "rear" or "rearward" refer to that portion that would face away or be farther from the user.

As used herein, the term proximal refers to that portion closest to a centerline of the supplemental computing display assembly, and the term distal refers to that portion farthest the centerline of the supplemental computing display assembly.

Figure 1:
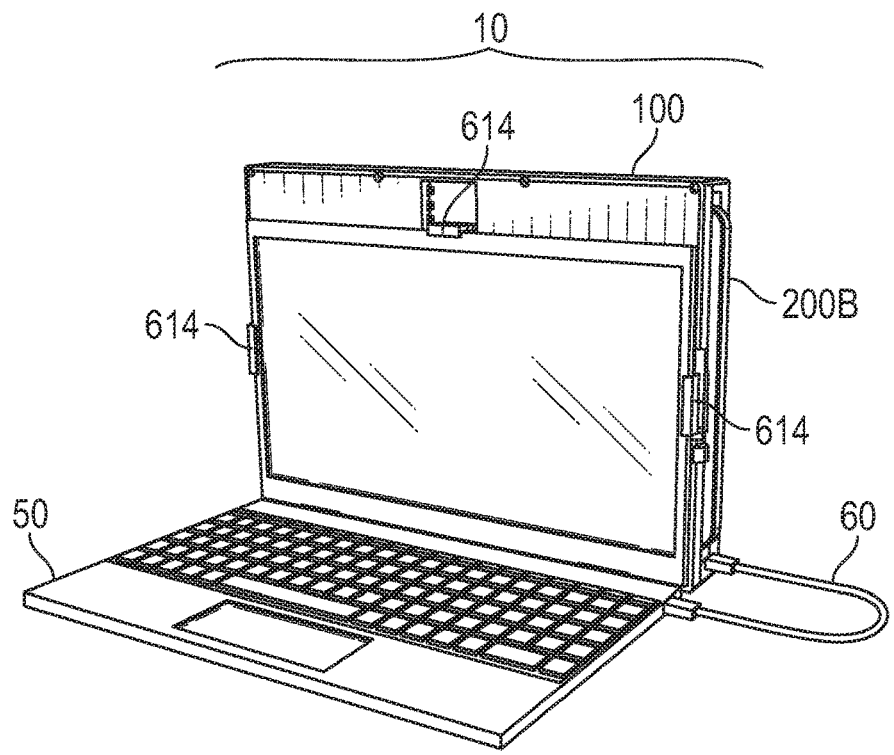
FIG. 1 is a perspective view of an exemplary aspect of a supplemental computing display system having a supplemental computing display assembly and a portable computing device, in accordance with the present disclosure.
Figure 2:
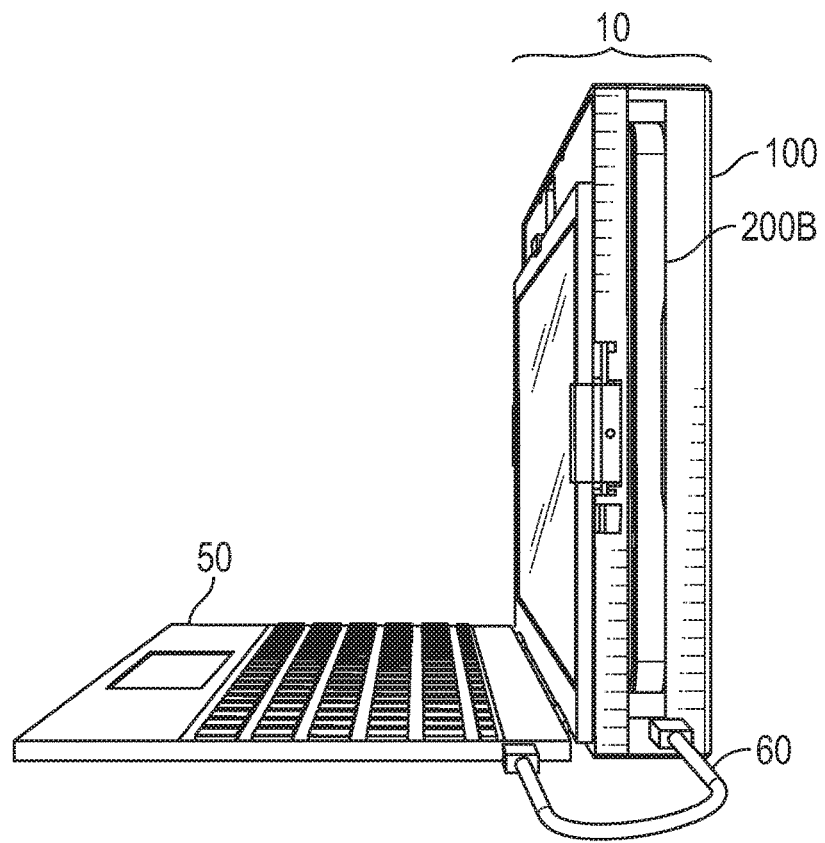
FIG. 2 is a side view of the supplemental computing display system of FIG. 1.
Figure 3:
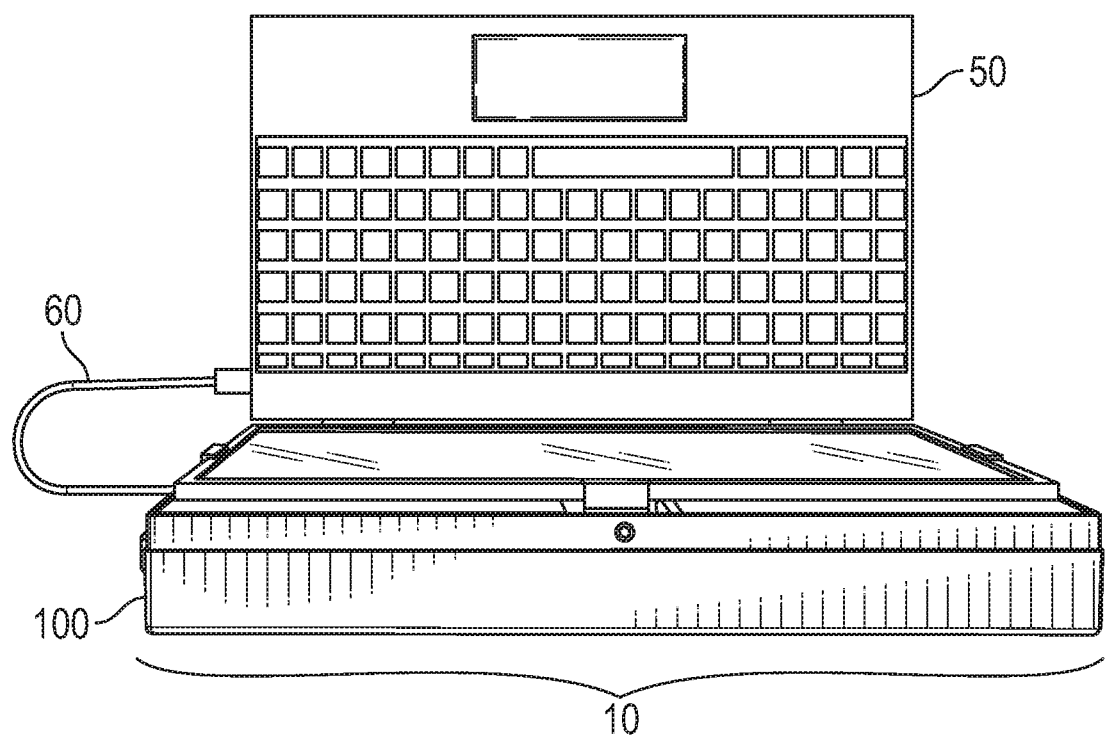
FIG. 3 is a top view of the supplemental computing display system of FIG. 1.
Figure 4:
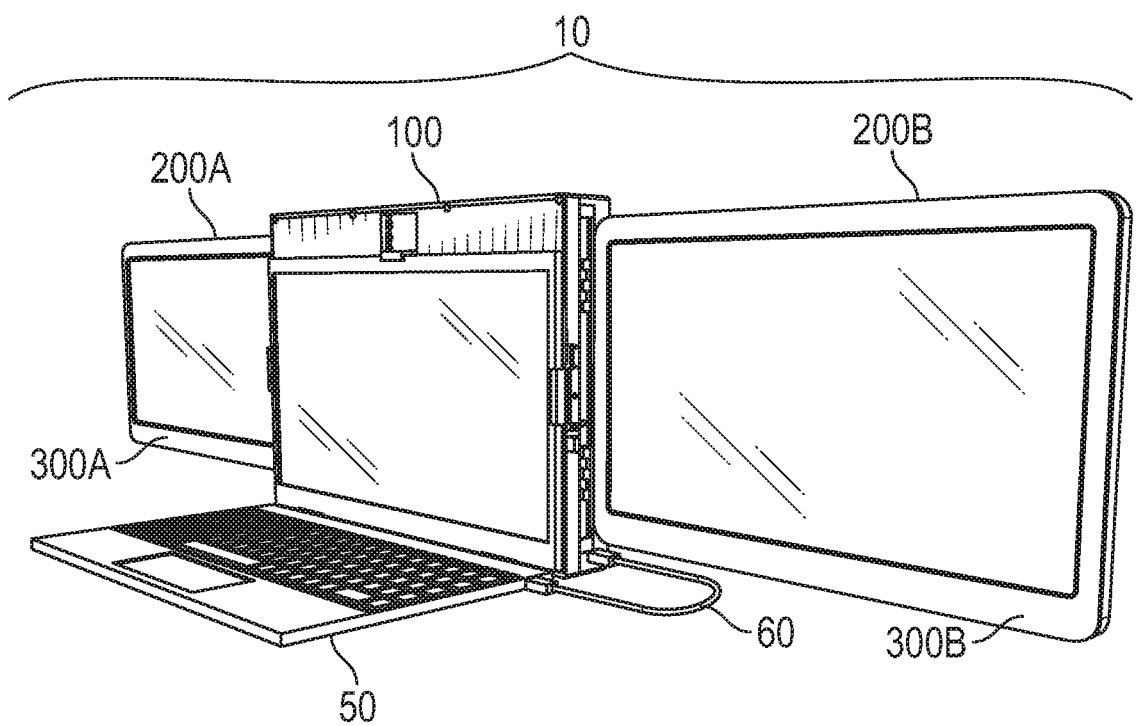
FIG. 4 is a perspective view of the supplemental computing display system of FIG. 1 with the arm assemblies of the supplemental computing display assembly thereof shown in a first extended position relative to the computing device.
Figure 9:
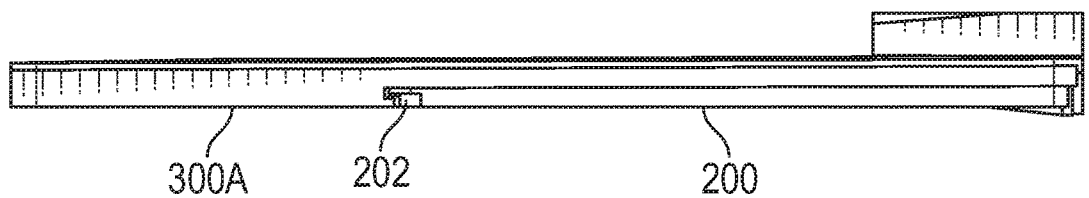
FIG. 9 is a cutaway view of the arm assembly of the supplemental computing display system of FIG. 1.
Figure 14:
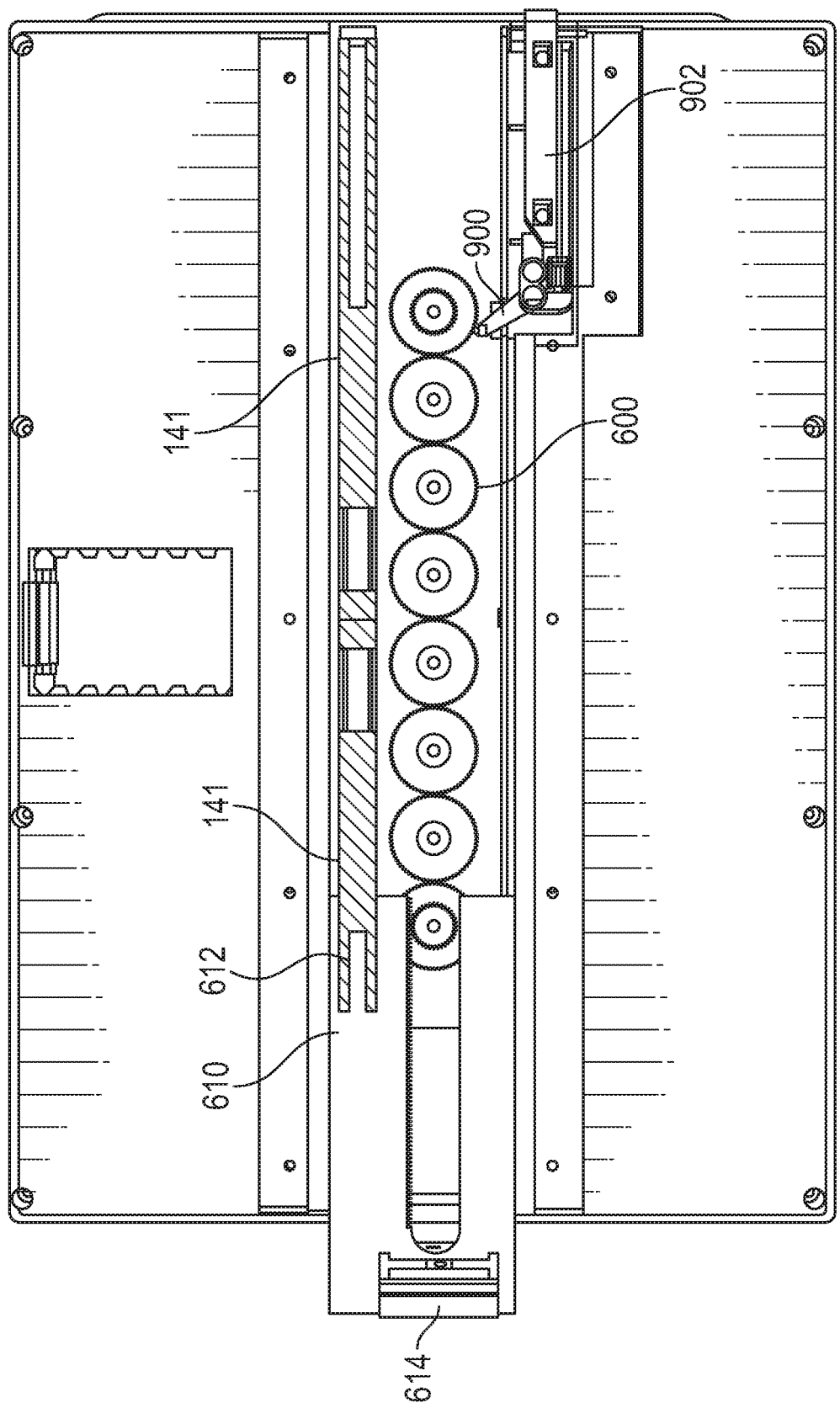
FIG. 14 is a gear assembly of the supplemental computing display system of FIG. 1.
Figure 15:
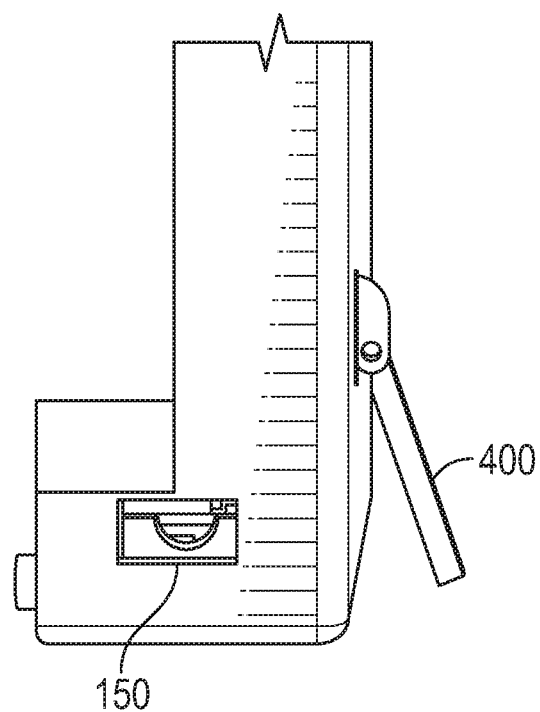
FIG. 15 illustrates a kickstand of the supplemental computing display system of FIG. 1, with the kickstand shown in an open position.

With reference to FIGS. 1-6, a supplemental computing display assembly 10 for connecting monitors to a portable computing device 50 is shown. The supplemental computing display assembly 10 may be operatively coupled to a portable computing device 50 to define a system. The supplemental computing display assembly 10 may include, but is not limited to, a main housing 100, a display housing 300 (as shown in FIG. 4 or FIG. 9), a varying gear assembly 600 (as shown in FIG. 14), arm assemblies 200A, 200B (as shown in FIG. 2), and a kickstand 400 (as shown in FIG. 15), wherein such components are described in greater detail hereinbelow. The supplemental computing display assembly 10 may be configured to connect additional monitors to a portable computing device 50 via a data transmission cable 60. The portable computing device 50 may include, but is not limited to, a tablet, a laptop, a PDA, or any other electronic device that may be connected to additional monitors. The supplemental computing display assembly 10 includes coupling arm tabs 614 that are configured to mechanically attach to the portable computing device 50.

Figure 13:
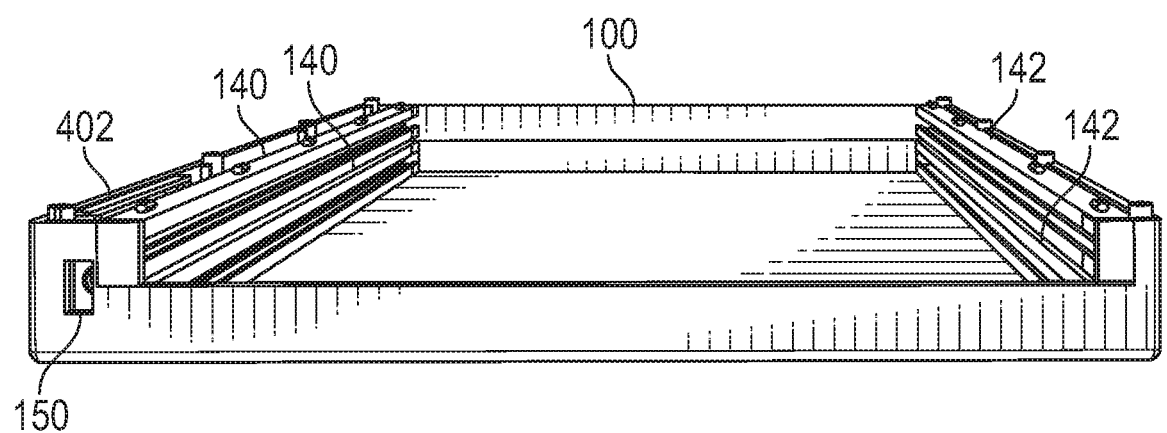
FIG. 13 is a perspective side view of the main housing of the supplemental computing display system of FIG. 1 with a spacer in the center of the main housing removed for clarity.

With reference to FIG. 2, the arm assemblies 200A, 200B may be stored within the main housing 100 of the supplemental computing display assembly 10 when not in use. Further, the arm assemblies 200A, 200B may extend out of/or retract into the main housing 100. The arm assemblies 200A, 200B may be operatively coupled to rails 140, 142 (as shown in FIG. 13) and are configured to slide across the rails 140, 142 (FIG. 13) in order to extend out of/or retract into the main housing 100.

With reference to FIG. 4, both arm assembly 200A and arm assembly 200B are shown extended outwards and oriented in landscape orientation. In accordance with the present disclosure, the display assemblies 300A and 300B may be operatively coupled to the arm assemblies 200A and 200B. The display assemblies 300A and 300B may be configured to be oriented between a landscape orientation and a portrait orientation.

Figure 5:
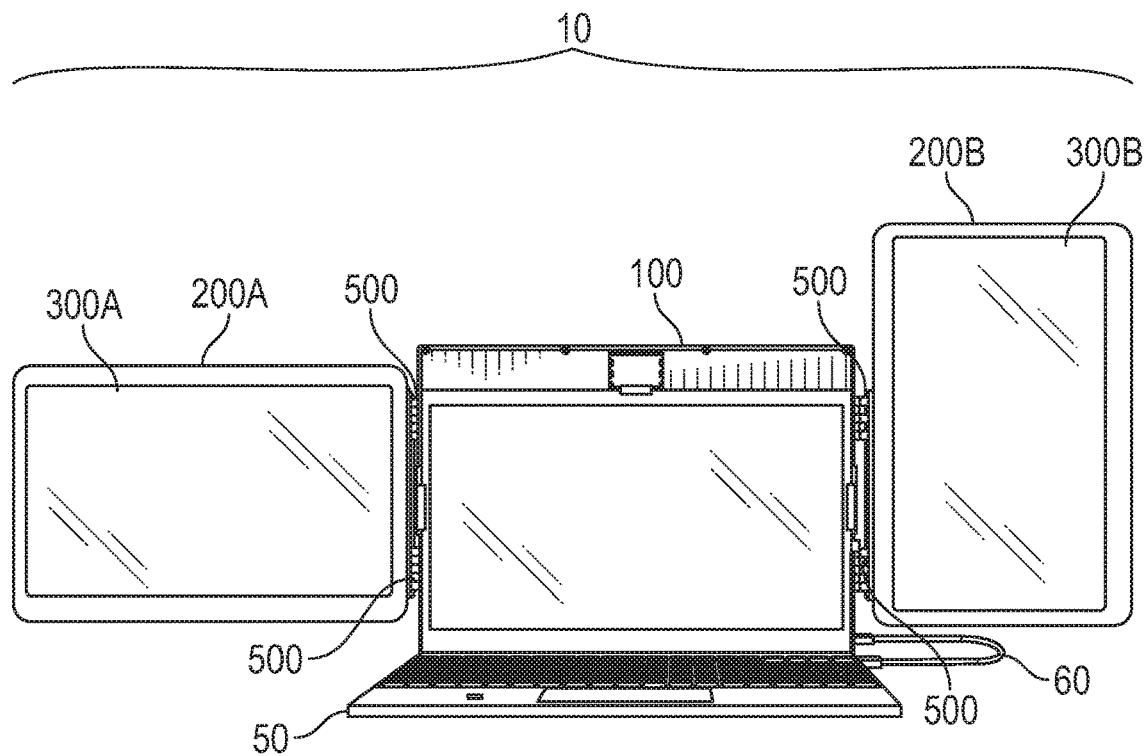
FIG. 5 is a front view of the supplemental computing display system of FIG. 1 in a second extended position with a first monitor assembly of the supplemental computing display assembly in a landscape orientation and a second monitor assembly thereof in a portrait orientation.

With reference to FIG. 5, both arm assembly 200A and 200B are shown extended outwards, display assembly 300A is oriented in landscape orientation, and monitor assembly 300B is oriented in portrait orientation. It is contemplated that the display assemblies 300A and 300B may be oriented in different or similar orientations at the same or different times.

Figure 6:
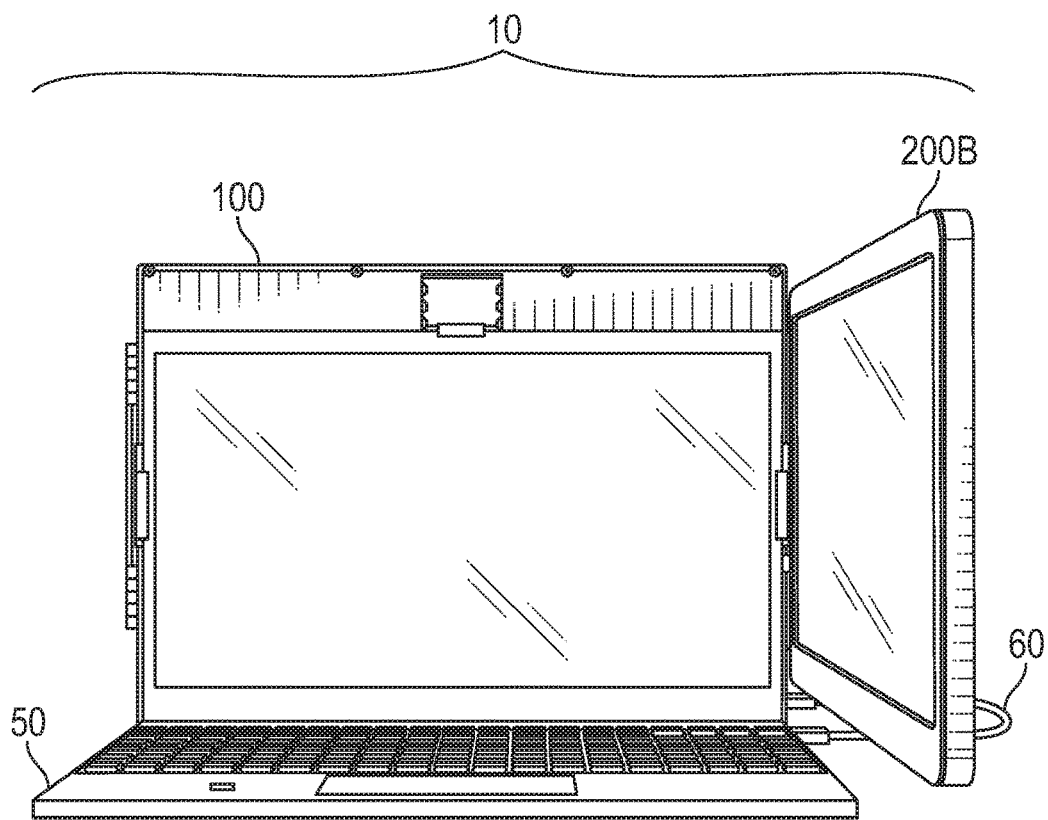
FIG. 6 is a front perspective view of the supplemental computing display system of FIG. 1 with the arm assemblies of the supplemental computing display assembly shown in a third extended position, a first monitor assembly open to 90 degrees forward and in landscape orientation, and a second monitor assembly in an outwardly exposed position that is 180 degrees rotated to the back.

With reference to FIG. 6, the arm assembly 200B is shown extended, oriented in landscape orientation, and positioned perpendicular to the portable computing device 50.

Figure 7:
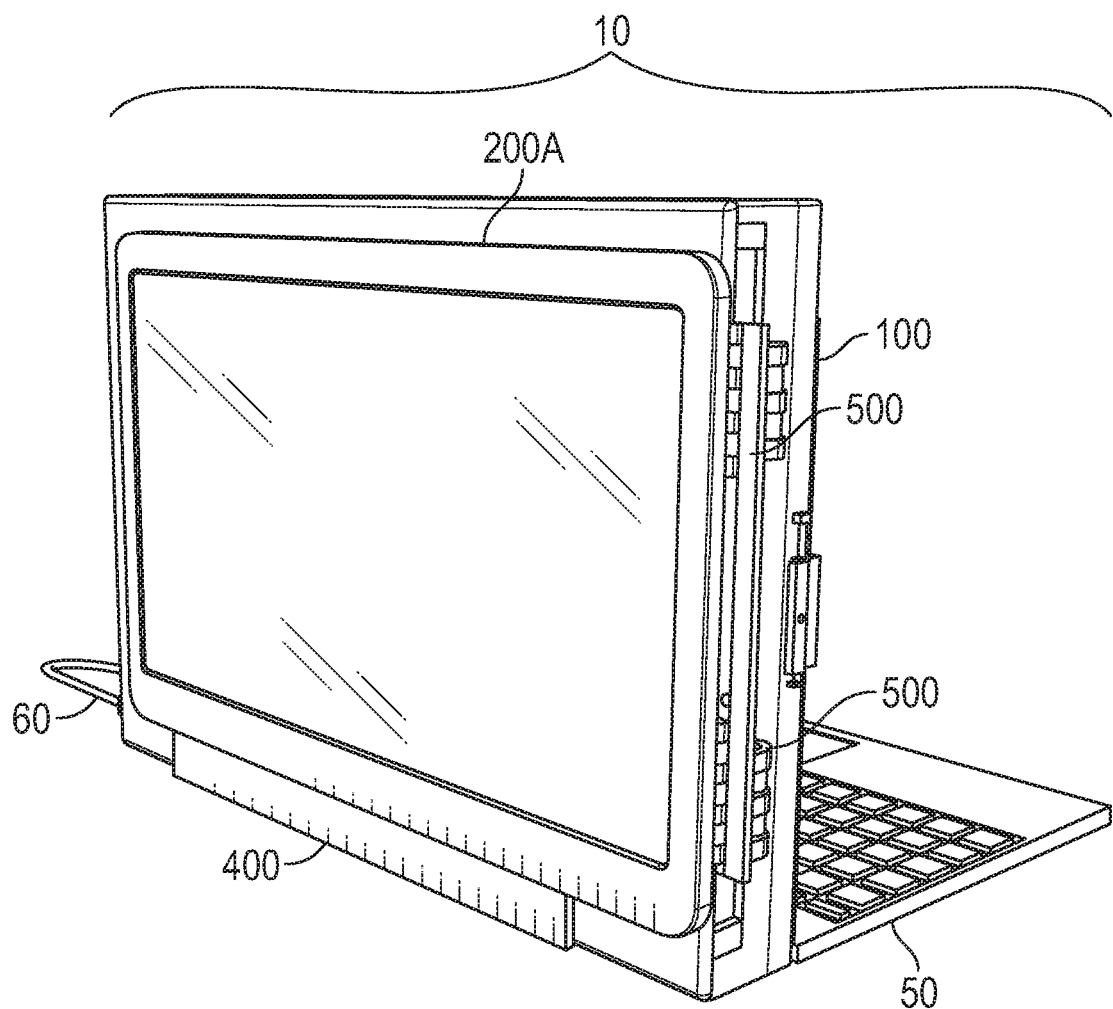
FIG. 7 is a perspective view of the supplemental computing display system of FIG. 6 illustrating the second monitor in the outwardly exposed position that is 180 degrees rotated to the back.

With reference to FIG. 7, the arm assembly 200A is oriented in the landscape position and is positioned flush with the backside of the main housing 100 of the supplemental computing display assembly 10 and parallel with the supplemental computing display assembly 10. A kickstand 400 is shown operatively coupled to the supplemental computing display assembly 10, which is described in more detail hereinbelow. With continued reference to FIG. 7, a data transmission cable 60 is shown connecting the supplemental computing display assembly 10 to a portable computing device 50. Both arm assembly 200A and 200B are configured to be able to be positioned in different orientations, independent of each other.

Figure 8:
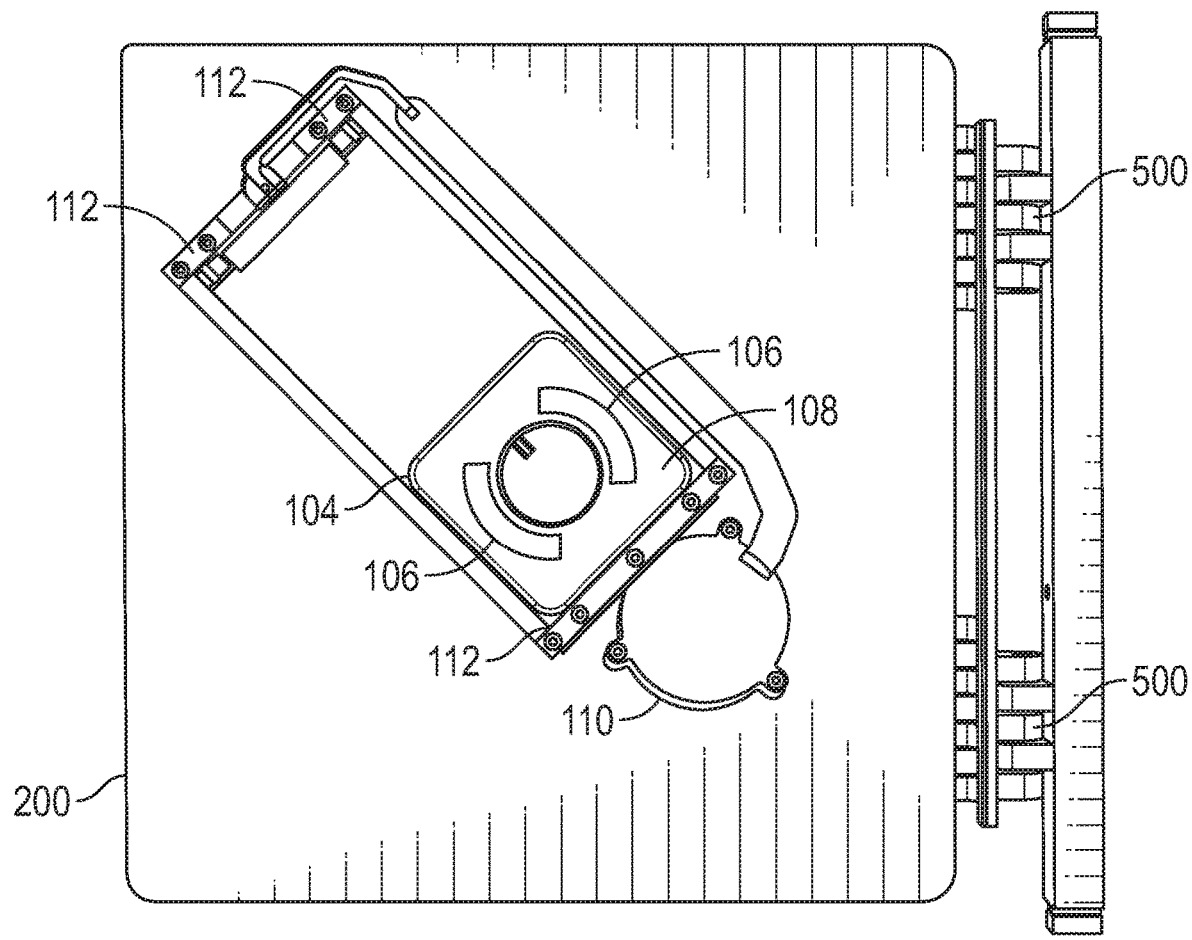
FIG. 8 is a front view of an arm assembly of the supplemental computing display system of FIG. 1.

With reference to FIG. 8, an arm assembly 200 may be operatively coupled to the main housing 100 of the supplemental computing display assembly 10 by use of hinge assemblies 500. The functionality of the hinge assemblies 500 is described in greater detail hereinbelow. It is contemplated that the hinge assembly 500 may allow the arm assemblies 200A, 200B to pivot to various viewing angles (e.g., 90-degree forward rotation, 180-degree rearward rotation, and any angle therebetween). With continued reference to FIG. 8, the arm assembly may include a carriage 104 positioned near the center of the arm assembly. The carriage 104 may allow for movement of a display operatively coupled to an arm assembly 200. The carriage may include a round pocket 108 in the center, as well as curved trenches 106. The carriage 104 may be used to move the display up and down, and allow the display to be rotated from landscape to portrait orientation. The arm may include sub covers 112 that may secure a rod to the arm assembly 200, and allow the carriage to move at approximately a 45-degree angle. The cover piece 110 may cover the view of the cables connected from a PCB holding pen to a display, via an arm assembly. In various aspects, the rotation may also be implemented by one or more ball bearings on a track or a track or edge with a 90-degree angle. For example, a ball bearing, placed in round pocket 108, would then replace the need for the curved trenches 106, as that track would not be needed to rotate the display assembly 300A or 300B.

With reference to FIG. 9, the arm assembly 200 attached to the display assembly 300A is shown in accordance with the present disclosure. The arm assembly may include a lip 202 positioned on the side opposite to the hinge assembly 500 and on top of the arm assembly. The display assembly 300A may be configured to overlap the lip 202, and thus may provide improved structural support for the display housing 300. Further, the arm assembly 200 may lock against the display assembly 300A in order to provide improved structural support for the display assembly 300A.

Figure 10:
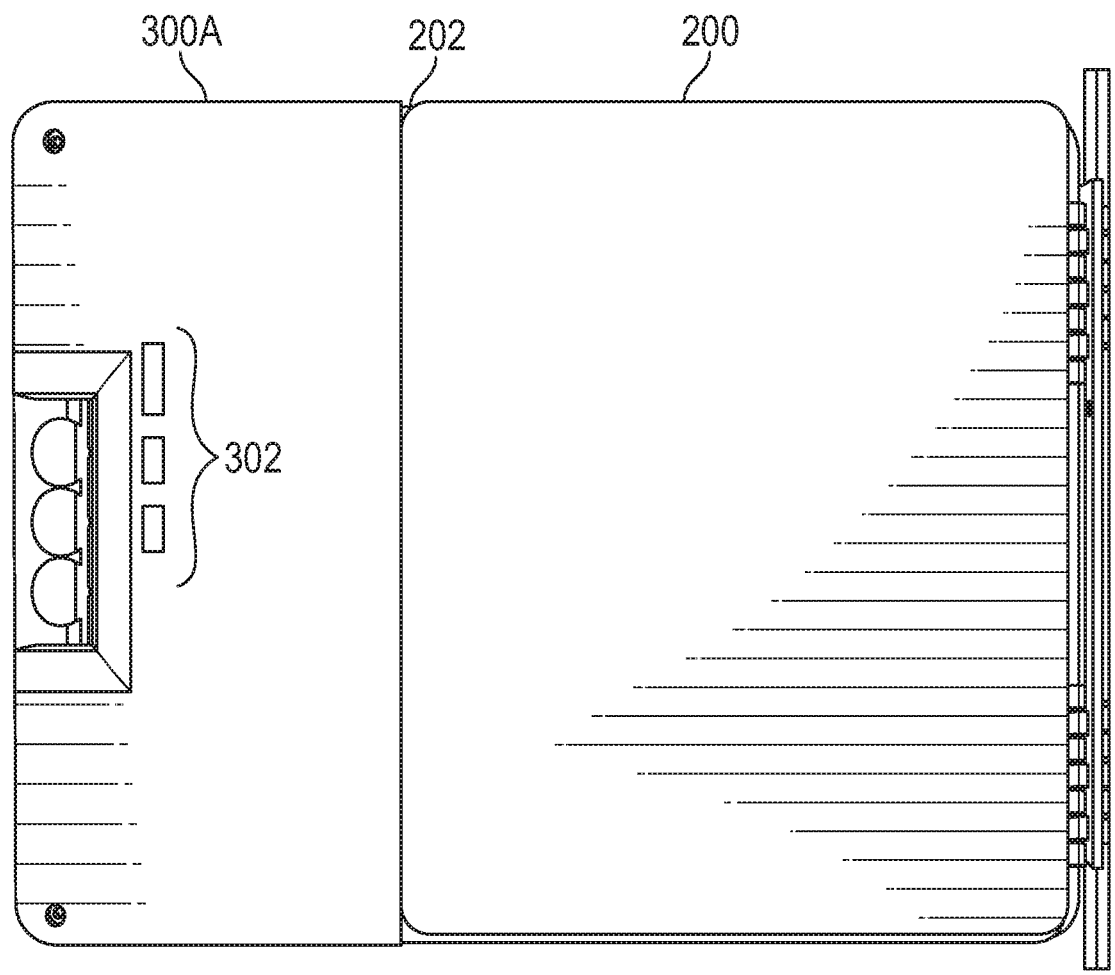
FIG. 10 is a rear view of a backside of the arm assembly of the supplemental computing display system of FIG. 1.

With reference to FIG. 10, another view of how the display assembly 300A may overlap the lip 202 of the arm assembly 200 is shown in accordance with the present disclosure. Further, the display assembly 300A may include buttons 302 on the backside of the enclosure. The buttons 302 on the backside of the display assembly 300A may be configured to connect to the PCB of the displays in one or both of the display assemblies 300A. The buttons 302 may be used for powering on and/or powering off the display(s), controlling the brightness control of the display(s), controlling the sound output of the display(s), or for any other suitable use.

Figure 11:
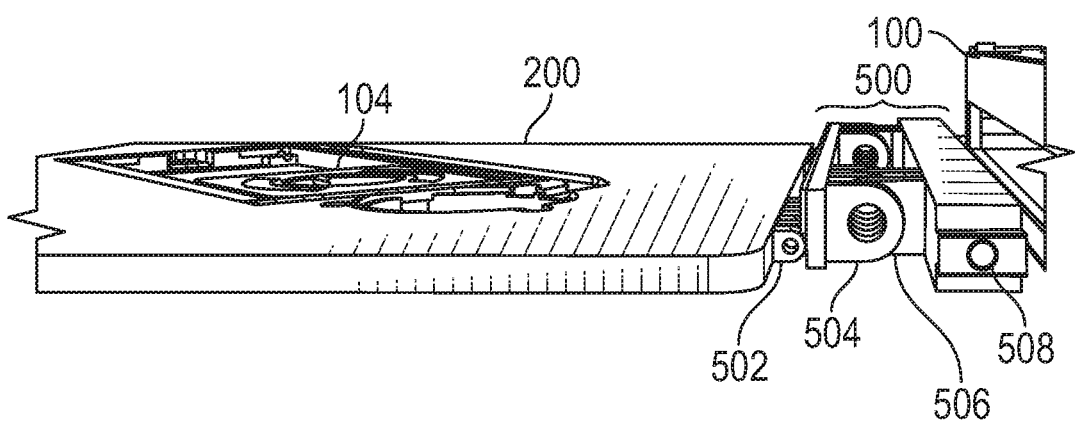
FIG. 11 is an isometric side view of the arm assembly of the supplemental computing display system of FIG. 1.

With reference to FIG. 11, a hinge assembly 500 for the supplemental computing display assembly 10 for connecting monitors to a portable computing device 50 is shown in accordance with the present disclosure. The hinge assembly 500 may be operatively coupled between the arm assembly 200, and the main housing 100 of the supplemental computing display assembly 10 disclosed herein. The hinge assembly 500 may include various components, including, but not limited to, a small hinge 502, a first hinge piece 504, and a second hinge piece 506. The second hinge piece may include an aperture 508 large enough for a data transmission cable from the main PCB 150 to pass through, which may connect the portable computing device 50 to a display through data transmission cable 60. The hinge assembly 500 may allow the display to be adjusted approximately 90 degrees forward and approximately 180 degrees backward, in the horizontal plane. Further, the hinge assembly 500 may allow the arm assemblies 200A, 200B to be adjusted so that the displays of the arm assemblies 200A, 200B may be parallel and flush with the portable computing device.

Figure 12:
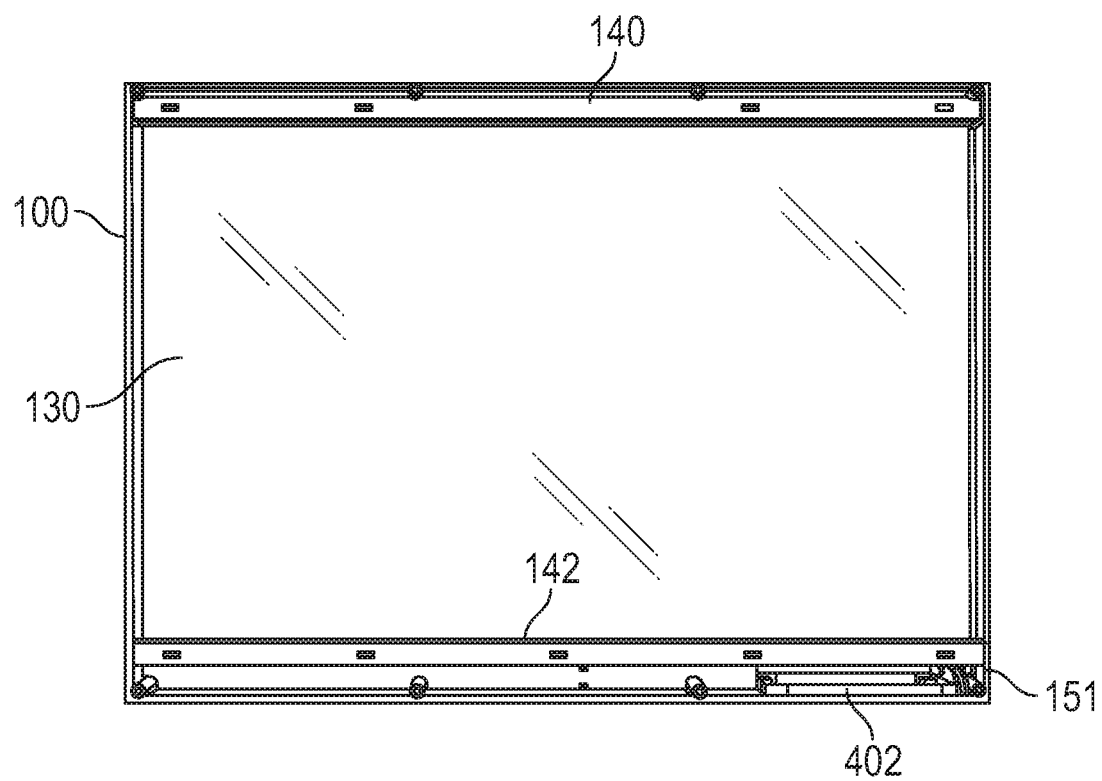
FIG. 12 is a front view of a main housing of the supplemental computing display system of FIG. 1.

With reference to FIG. 12, the main housing 100 for the supplemental computing display assembly 10 for connecting monitors to a portable computing device 50 is shown in accordance with the present disclosure. The main housing 100 of the supplemental computing display assembly 10 may include a PCB holding pen 402, which may be held and connected to displays and a portable computing device 50. Furthermore, the main body may include rails 140, 142 that may allow the arm assemblies 200A, 200B to move along with the hinge assembly 500. Further, the main body may include a spacer 130, which may divide the cables from the displays so that the cables and displays do not snag or catch against each other. Furthermore, there may be a data transmission cable aperture 151 adjacent to the PCB holding pen 402, through which a data transmission cable 60 (e.g., USB, HDMI, DVI, Thunderbolt®, etc.) may pass and connect to a suitable data transmission port on a portable computing device. While not shown in the drawings, the main body may include multiple data transmission ports on either side of the main body that may allow a data transmission cable to connect to any available port on a user's personal device.

With reference to FIG. 13, the main housing 100 may include a PCB holding pen 402, configured to hold a PCB. Each set of rails 140, 142 may allow for a display to move along, and thus may allow both displays to expand out or contract within the main housing 100 of the supplemental computing display assembly 10.

With reference to FIG. 14, the gear assembly 600 is shown in accordance with the present disclosure. The gear assembly 600 may be disposed on the back surface of the main housing 100. The gear assembly may be comprised of at least one gear or may be comprised of a plurality of gears. The gear assembly may synchronize the movement of the two coupling arm assemblies 610 and therefore the coupling arm tabs 614. In various aspects, a tube 141 (which would have a proximal and a distal end) may include a spring (not shown) that is configured to interact via a tab 612 disposed at the end of coupling arm assembly 610, configured to assist with initially pushing the coupling arm assemblies out and for providing additional force to the coupling arms attaching to the portable computing device 50. The coupling arm assembly 610 includes teeth (not shown) configured to be advanced in a longitudinal direction by the gear assembly 600. In aspects, a latch system may be used to control the movement of the gear assembly. The latch system may include a latch arm 900 configured to pivot to release at least one gear of the gear assembly 600, and an actuation bar 902. The actuation bar is configured to actuate the pivot of the latch arm. The gear assembly 600 may include a rack and pinion system to the coupling arms.

Figure 16:
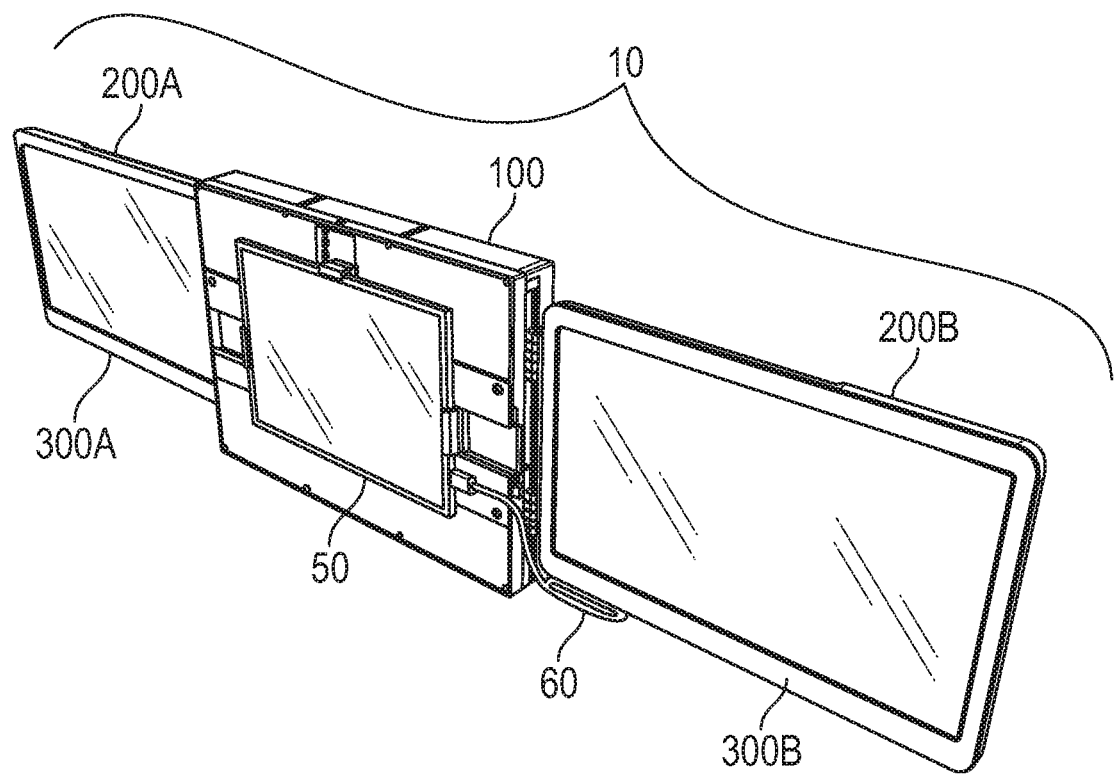
FIG. 16 is a front perspective view of an exemplary aspect of a supplemental computing display system having a supplemental computing display assembly and a tablet, the supplemental computing display assembly shown coupled to the tablet, the supplemental computing display assembly shown with arm assemblies thereof in a first extended position in accordance with the present disclosure.

With reference to FIG. 15, a kickstand 400 is operatively coupled to the supplemental computing display assembly 10 and is shown in the open position. The kickstand 400 may be operatively coupled to the back surface of the main body of the supplemental computing display assembly 10. The kickstand 400 may be deployed in order to provide greater support for the supplemental computing display assembly 10. While in a closed position, the kickstand 400 may be flush with the main housing 100 of the supplemental computing display assembly 10. With reference to FIG. 16, the kickstand 400 is shown in the open position. While in the open position, the kickstand 400 may assist the display of the portable computing device 50 to stay upright in the event that the portable computing device 50 may not be able to handle the weight of the additional displays. For example, the kickstand may also allow a user to position the arm assemblies 200A, 200B further back than would otherwise be possible without compromising the ability of the display of the portable computing device to stay upright. Furthermore, the kickstand 400 may allow the supplemental computing display assembly 10 to be used independently from a portable computing device 50. The portable computing device 50 would not need to be attached and thus may allow a user to use the supplemental computing display assembly 10 without attaching a portable computing device 50.

With reference to FIG. 16, a perspective view of the supplemental computing display assembly 10 for connecting monitors attached to a tablet computing device is shown. Both arm assembly 200A and arm assembly 200B are shown extended outwards and oriented in landscape orientation. In accordance with the present disclosure, the display assemblies 300A and 300B may be operatively coupled to the arm assemblies 200A and 200B. The display assemblies 300A and 300B may be configured to be oriented between a landscape orientation and a portrait orientation.

Figure 30A:
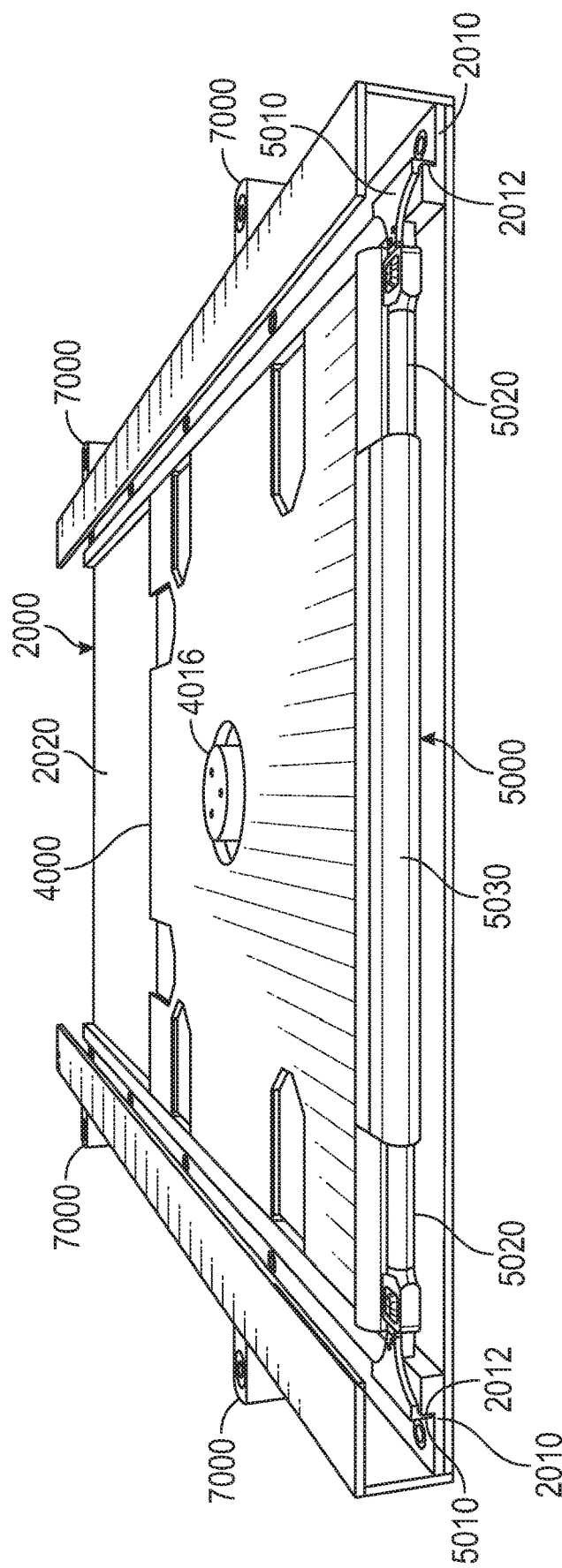
FIG. 30A is a front perspective view of a display housing of the supplemental computing display system of FIG. 17 with the arm assembly disposed therein and coupled to a hinge assembly.

With reference to FIGS. 17-23, in another aspect of this disclosure, a supplemental computing display assembly 10' for connecting monitors to a portable computing device 50 is shown. The supplemental computing display assembly 10' is operatively coupled to a portable computing device 50 to define a computer and display system. The supplemental computing display assembly 10' includes a main housing 1000, and at least one of each of a display housing 2000 (as shown in FIG. 30A), a display assembly 3000 coupled to an arm assembly 4000, and a rack gear 6000 (as shown in FIGS. 33-41), wherein such components are described in greater detail hereinbelow. The display housing 2000 is coupled to the main housing 1000. The display assembly 3000 is disposed in the display housing 2000 and is configured to extend/retract from the display housing 2000 via the arm assembly 4000. In aspects, the supplemental computing display assembly 10' includes first and second display assemblies 3000A, 3000B disposed in display housings 2000A, 2000B, each coupled to first and second arm assemblies 4000A, 4000B, respectively. Display housings 2000A, 2000B may be coupled to each other and/or the main housing 1000.

Figure 30B:
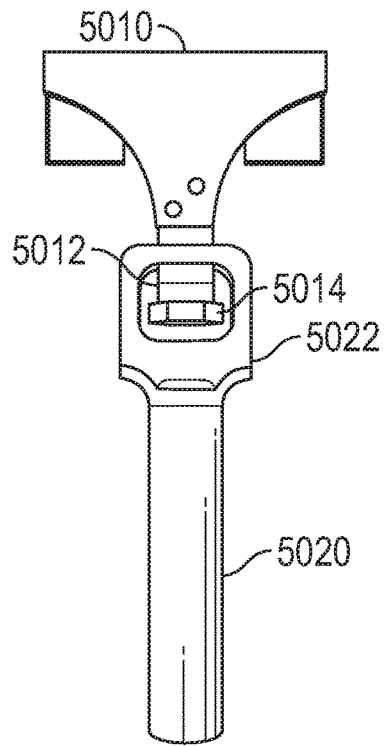
FIG. 30B is a front view of a trolley of the hinge assembly.
Figure 30C:
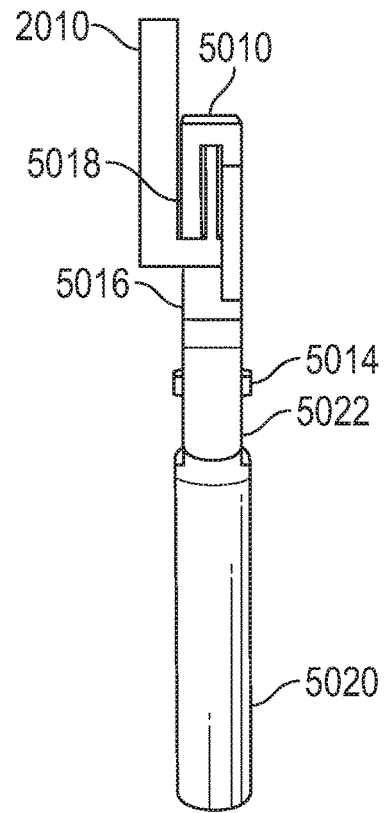
FIG. 30C is a side view of a trolley of the hinge assembly.

The display assemblies 3000A, 3000B may be stored within the display housings 2000A, 2000B of the supplemental computing display assembly 10' when not in use. Further, the arm assemblies 4000A, 4000B may extend out of or retract into the display housings 2000A, 2000B, respectively. The arm assemblies 4000A, 4000B may be operatively coupled to a display housing rail system via a hinge assembly 5000 (as shown in FIGS. 30A-C). The arm assemblies 4000A, 4000B are configured to slide across the display housing rail system 2010 in order to extend out of/or retract into the display housing 2000.

Figure 17:
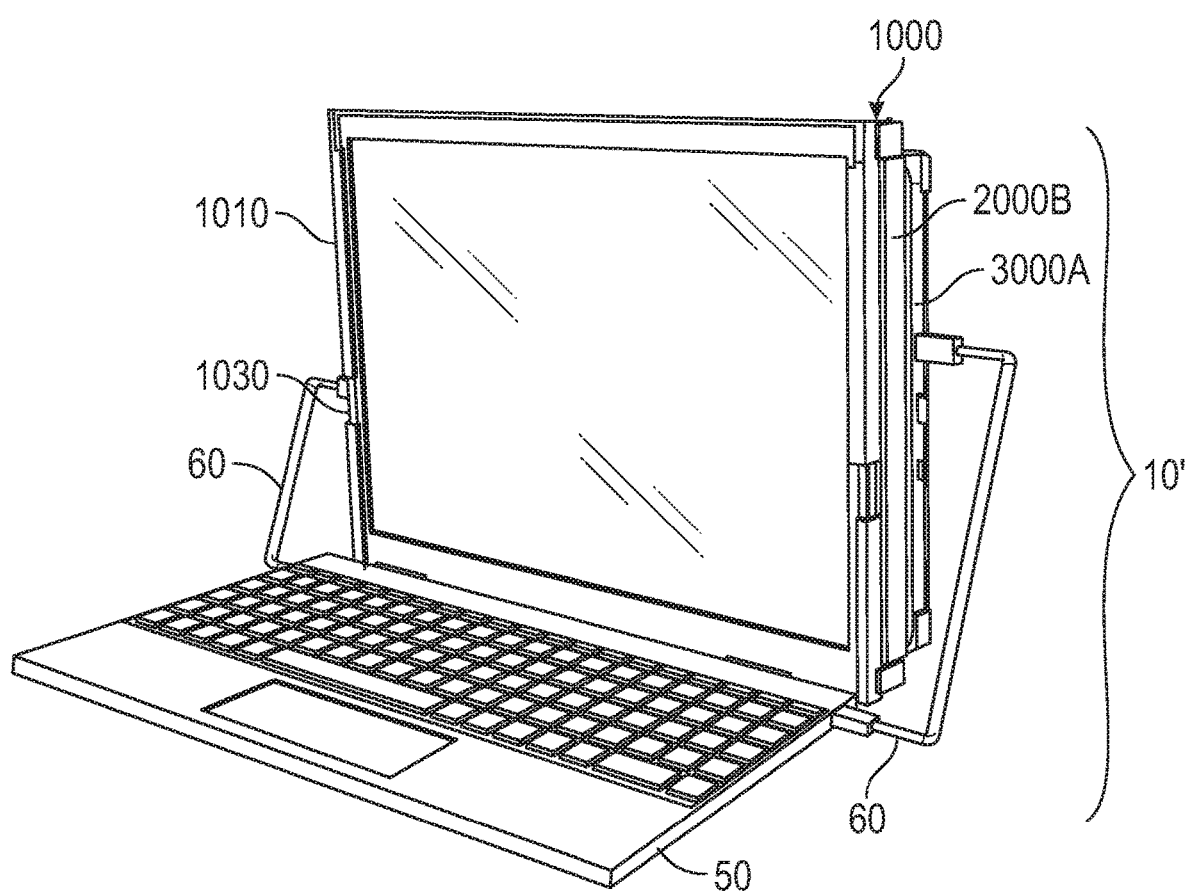
FIG. 17 is a perspective view of another exemplary aspect of a supplemental computing display system having a supplemental computing display assembly and a portable computing device, the supplemental computing display system shown coupled to the portable computing device, the supplemental computing display system shown with arm assemblies thereof in a default configuration in accordance with the present disclosure.
Figure 18:
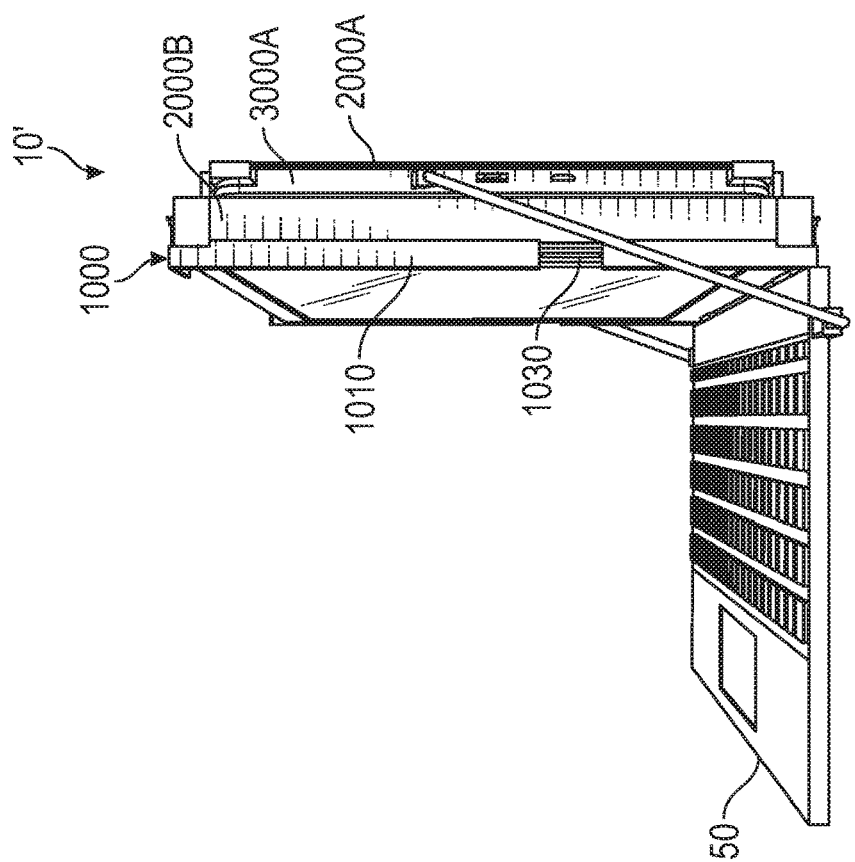
FIG. 18 is a side view of the supplemental computing display system of FIG. 17.

The supplemental computing display assembly 10' may be configured to connect additional monitors to a portable computing device 50 via at least one data transmission cable 60. The portable computing device 50 may include but is not limited to, a tablet, a laptop, a PDA, or any other electronic device that may be connected to additional monitors. The main housing 1000 of the supplemental computing display assembly 10' includes coupling arm latches 1010 that are configured to mechanically attach to the portable computing device 50. Coupling arm latches 1010 include a lip 1012 configured to cover edges of a monitor of a portable computing device 50, as shown in FIG. 17.

Referring to FIGS. 20-23, the supplemental computing display assembly 10' provides additional displays that may be oriented in a variety of configurations.

Figure 20:
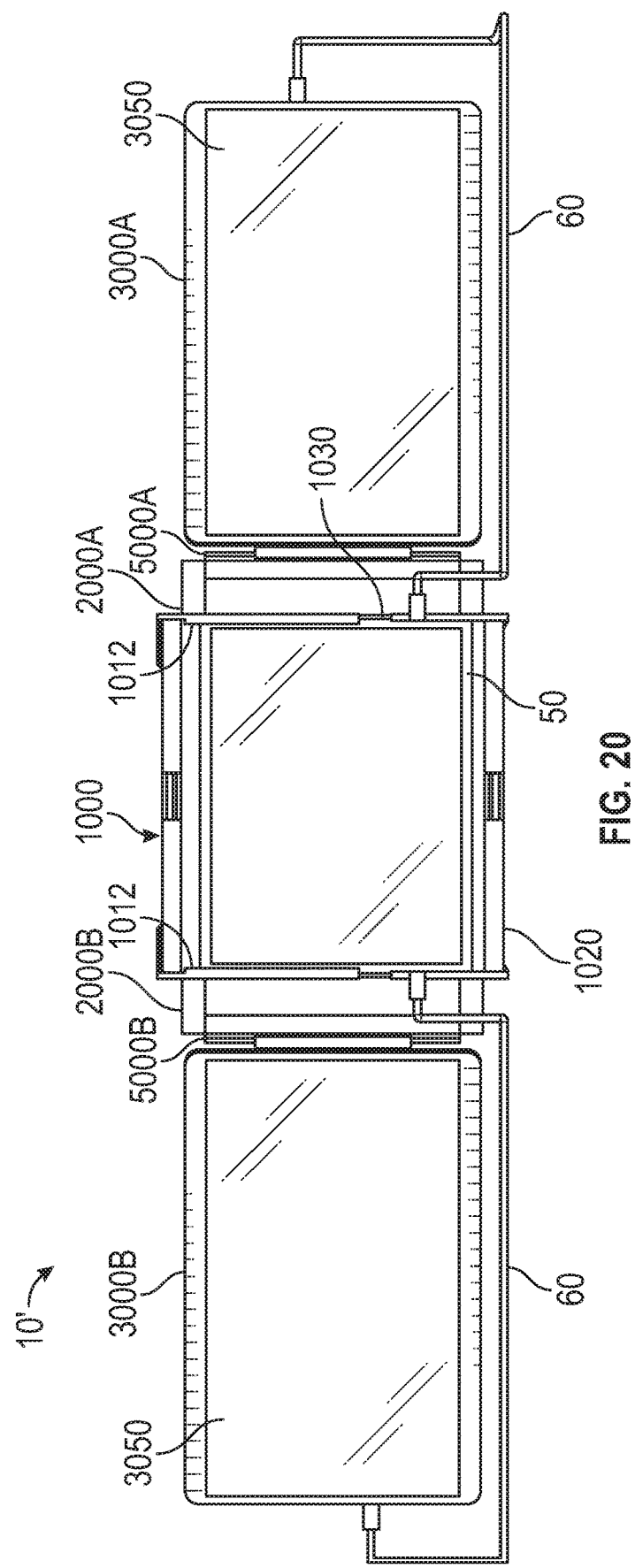
FIG. 20 is a front view of the supplemental computing display system of FIG. 17 coupled to a tablet, with the arm assemblies of the supplemental computing display assembly thereof shown in a first extended position.

With reference to FIG. 20, in one exemplary configuration, the display assemblies 3000A, 3000B may each be separately extended via the arm assemblies 4000A, 4000B, respectively, in landscape orientations. As shown in FIG. 20, the main housing 1000 is operatively coupled to a portable computing device 50 (e.g., a tablet).

Figure 21:
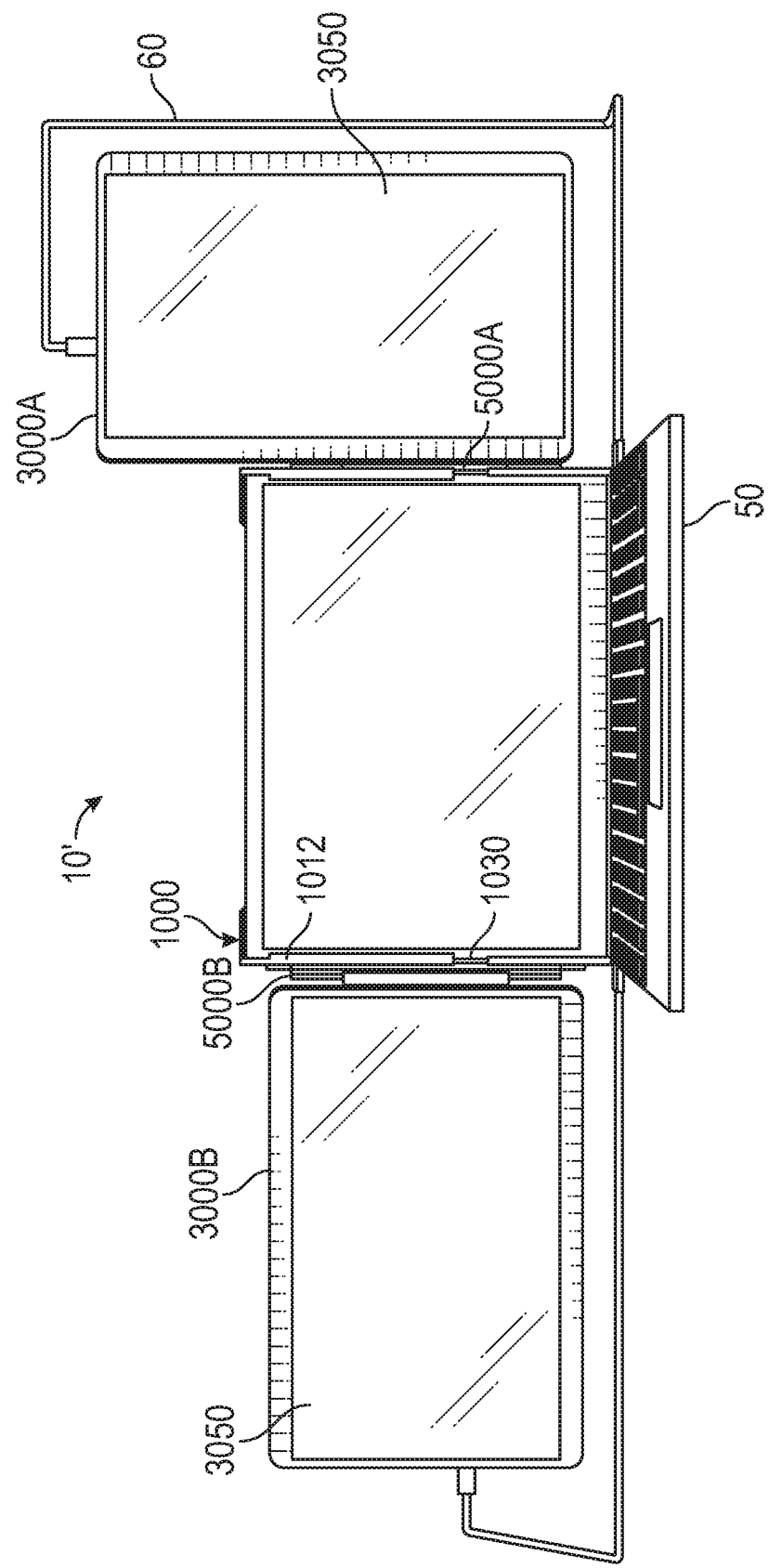
FIG. 21 is a front view of the supplemental computing display system of FIG. 18 in the extended position with a first monitor assembly of the supplemental computing display assembly in a landscape orientation and a second monitor assembly thereof in a portrait orientation.

With reference to FIG. 21, in another exemplary configuration, display assembly 3000A via arm assembly 4000A may be extended and positioned in a portrait orientation, while display assembly 3000B via arm assembly 4000B may be extended and positioned in a landscape orientation. In aspects, both display assemblies 3000A, 3000B may be extended to a portrait orientation. It is contemplated that the display assemblies 3000A, 3000B may be oriented in different or similar orientations at the same time.

Figure 22:
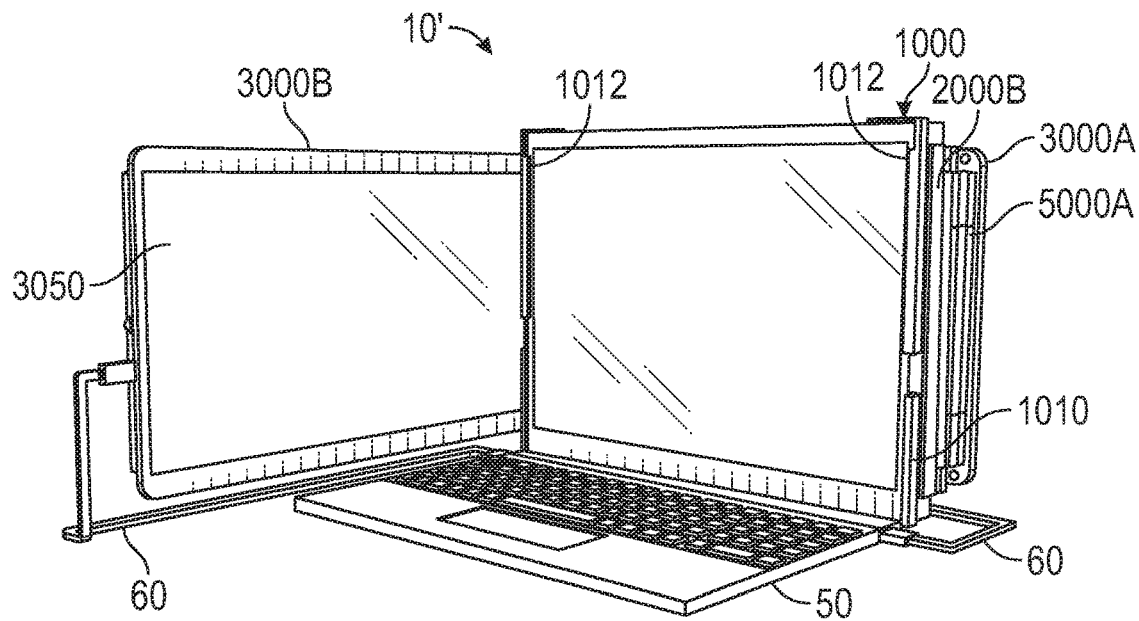
FIG. 22 is a front perspective view of the supplemental computing display system FIG. 17 with the arm assemblies of the supplemental computing display assembly shown open to 90 degrees forward and in landscape orientation, one of the arm assemblies supporting a display in an outwardly exposed position that is 180 degree rotated to the back.

With reference to FIG. 22, another exemplary configuration is illustrated with the display assembly 3000B extended, via arm assembly 4000B, oriented in landscape orientation, and positioned perpendicular to the portable computing device 50 via hinge assembly 5000B (see FIGS. 21 and 22).

Figure 23:
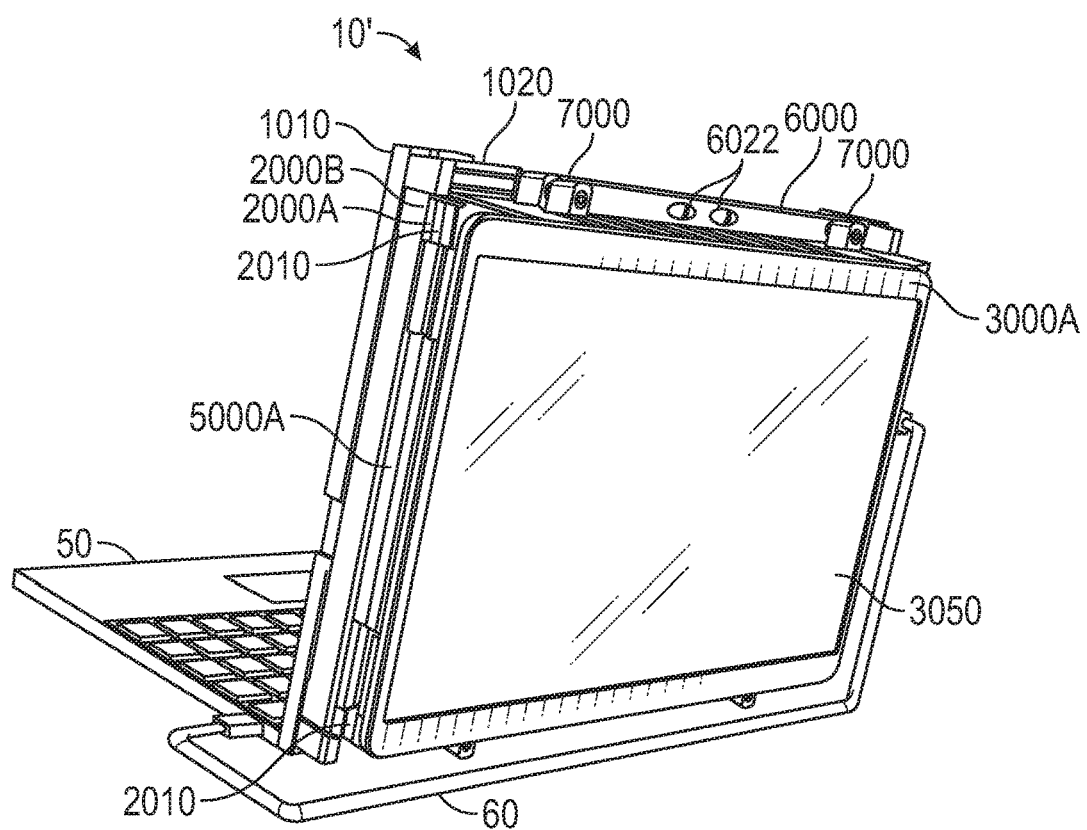
FIG. 23 is a back view of the supplemental computing display system of FIG. 17 with an arm assembly of the supplemental computing display extended and folded to the back of the main housing via a 180-degree spin.

With reference to FIG. 23, the display assembly 3000A via arm assembly 4000B, described in detail below, is oriented in the landscape position and is positioned, via hinge assembly 5000A, flush with a backside of display housing 2000A coupled to the main housing 1000 of the supplemental computing display assembly 10' and parallel with the supplemental computing display assembly 10'. A kickstand may be operatively coupled to the display housing 2000 or main housing 1000, similarly as kickstand 400, described in detail above. A data transmission cable 60 is shown connecting the supplemental computing display assembly 10' to a portable computing device 50.

Figure 24:
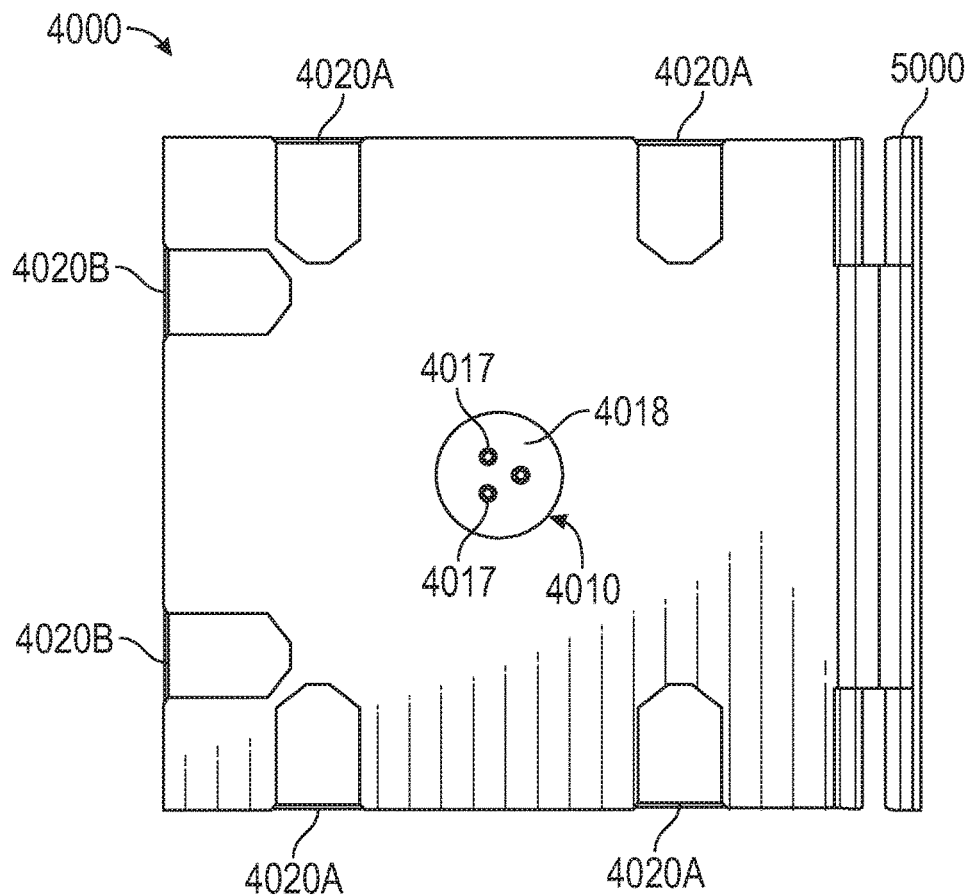
FIG. 24 is a front view of an arm assembly of the supplemental computing display system of FIG. 17.
Figure 26:
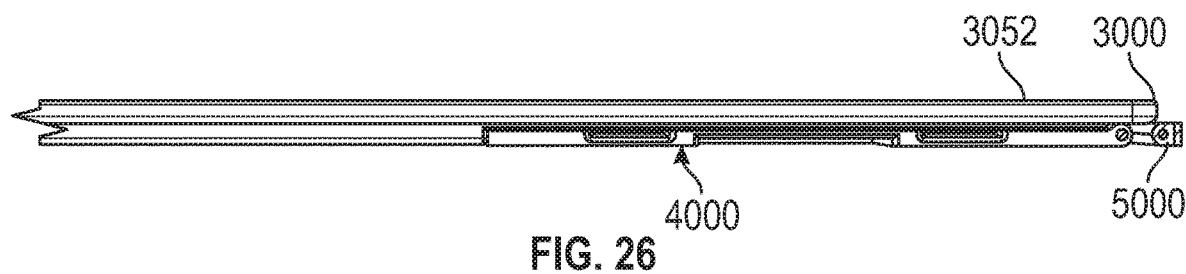
FIG. 26 is a side view of the display assembly coupled to the arm assembly of the supplemental computing display system of FIG. 17.
Figure 27:
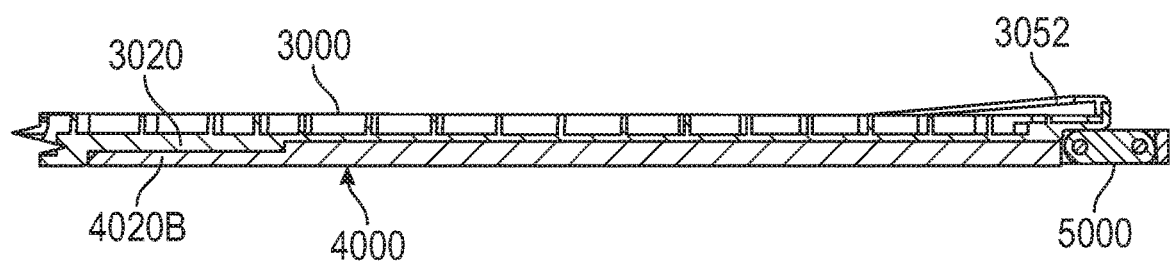
FIG. 27 is a sectional view of the display assembly coupled to the arm assembly of the supplemental computing display system of FIG. 17.
Figure 28:
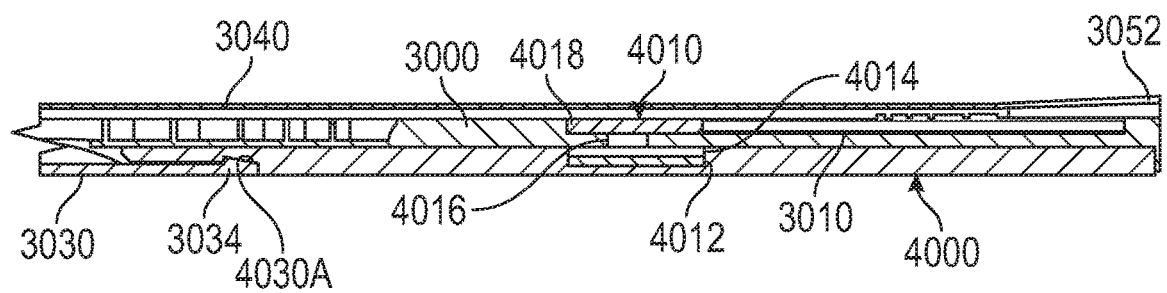
FIG. 28 is a sectional view of the display assembly coupled to the arm assembly of the supplemental computing display system of FIG. 17.
Figure 29:
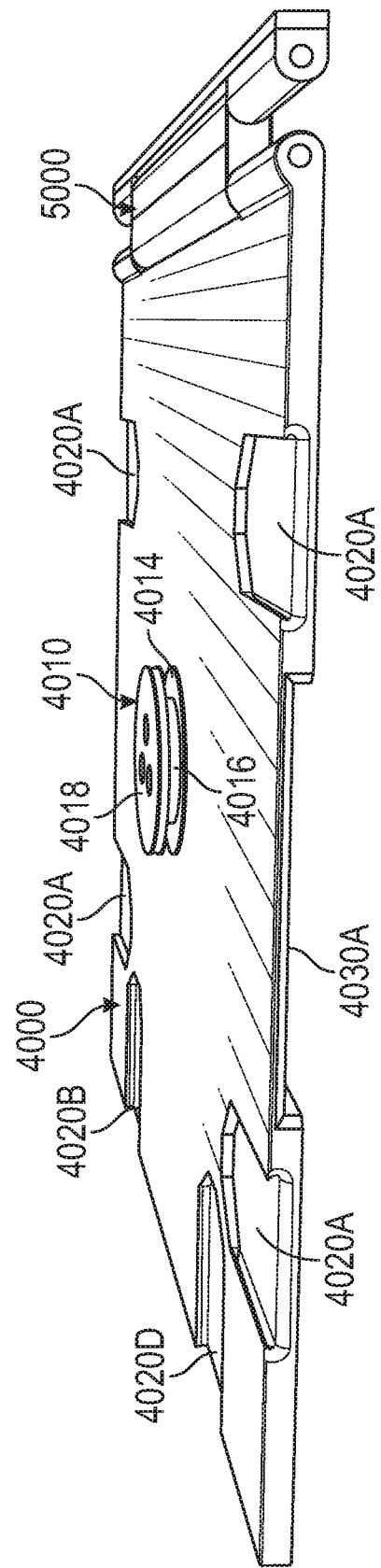
FIG. 29 is a perspective view of a side of the arm assembly of the supplemental computing display system of FIG. 17.
Figure 39:
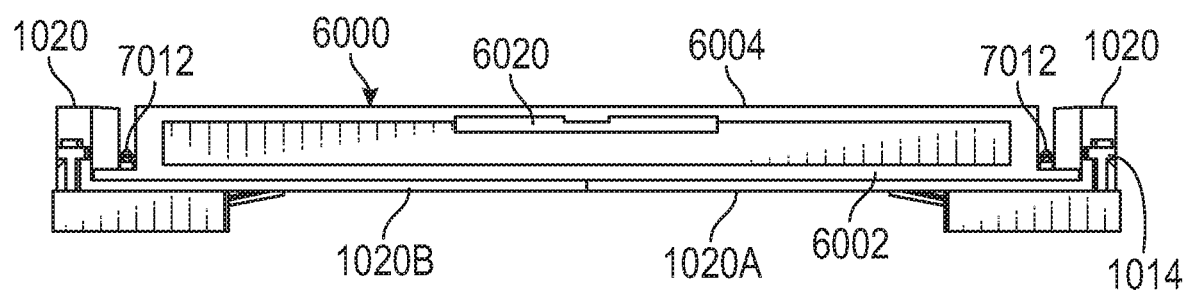
FIG. 39 is a top view of the housing supports coupled to the gear assembly, as shown in FIG. 33 of the supplemental computing display assembly of FIG. 17.

With reference to FIGS. 24-29, an exemplary arm assembly 4000 is configured to facilitate positioning and orienting of a display assembly 3000 coupled thereto. The arm assembly 4000 includes a pivot joint 4010 positioned near the center of the arm assembly. The pivot joint 4010 includes a pivot joint column 4016 (FIGS. 28 and 30A), spring washer 4012 and washer 4014 (FIGS. 29, 30), and a retainer head 4018 (FIGS. 24, 28, and 39). The column 4016 is configured to slidably engage the display assembly 3000 via a corresponding pivot joint column slot 3010 arranged on the rear of the display assembly 3000 (FIG. 28). The retainer head 4018 is coupled to the column 4016, (e.g., via screws 4017) or seated on column 4016, and is configured to retain the column 4016 within a pivot joint slot 3010 (FIG. 28) of display assembly 3000. The pivot joint slot 3010 is designed like a "T" so that the column 4016 is disposed within a smaller column slot of the pivot joint slot 3010 and the retainer head 4018 is in a larger retainer head slot of the pivot joint slot 3010. The pivot joint 4010 is configured to allow the display assembly 3000 to rotate between portrait and landscape orientations. Washer 4012 may be a spring configured to further hold the pivot joint 4010 within the pivot joint slot 3010 (FIG. 28). In aspects, the pivot joint may be replaced by a ball bearing and socket system (not shown) configured to couple the display assembly 3000 to the arm assembly 4000 to permit rotation of the display assembly 3000 into portrait and landscape orientations.

Figure 25:
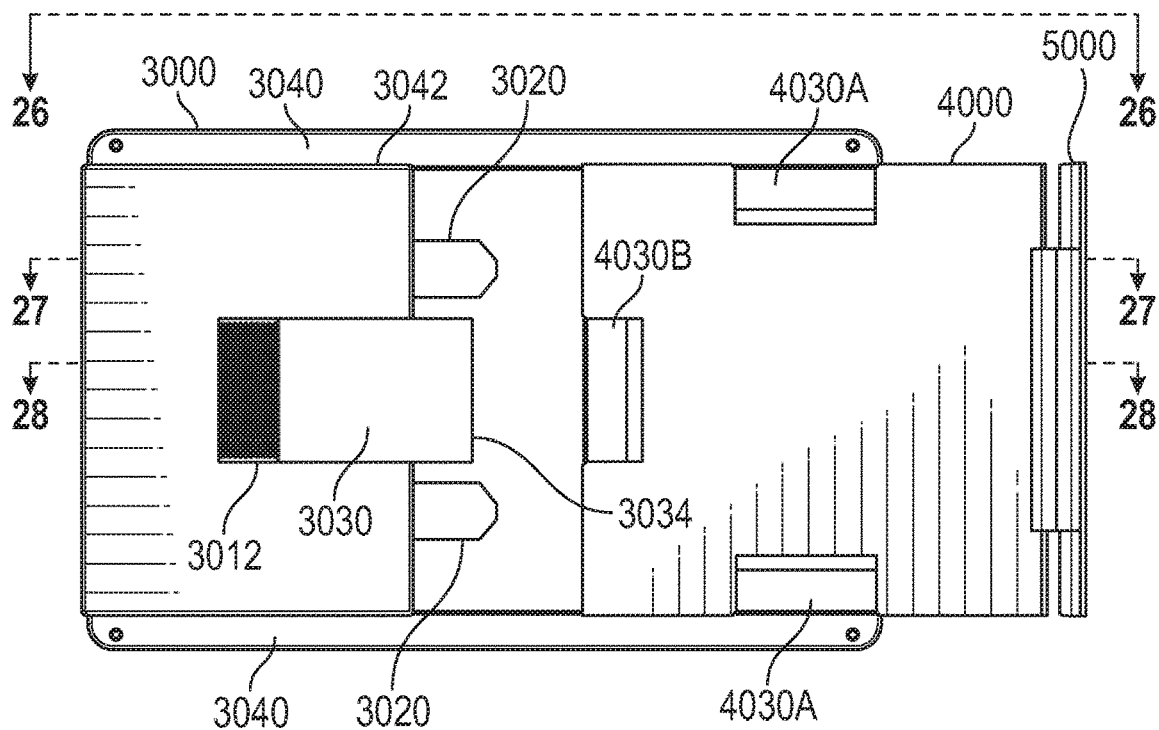
FIG. 25 is a rear view of a display assembly coupled to an arm assembly and the arm assembly coupled to a hinge assembly of the supplemental computing display system of FIG. 17.

The arm assembly 4000 includes at least one of each of orientation grooves 4020A and 4020B, orientation grooves 4020A, 4020B generally positioned vertically and horizontally, respectively. The orientation grooves 4020A, 4020B (FIG. 24) are shaped to correspond to display assembly tongues 3020 disposed on the rear or backside of the display assembly 3000 (FIG. 25). The grooves 4020A, 4020B fix the orientation of the display assembly 3000, such that when in a landscape position, the display assembly tongues 3020 slides into the grooves 4020B, and in a portrait orientation the display assembly tongues 3020 slides into grooves 4020A. FIG. 26 is a sectional view of FIG. 25, illustrating the display assembly tongue 3020 engaged with the orientation groove 4020B such that the display assembly 3000 is in a landscape orientation. Display assembly tongue 3020 would similarly engage orientation grooves 4020A when the display assembly 3000 is in a portrait orientation.

A display latch 3030 is coupled to the rear side of the display assembly 3000 and is configured to latch onto corresponding latch grooves 4030A and 4030B disposed on the rear side of the arm assemblies 4000 (FIG. 25). The display latch 3030 engages latch grooves 4030A or 4030B as shown in FIG. 28.

A user disengages the display latch 3030 by pressing on latch end 3032 to lift latch end 3034 out of either latch groove 4030A or 4030B in order to re-orient the display assembly between portrait and landscape orientations. After the display latch 3030 disengages the latch groove 4030A, 4030B, the user slides the display assembly 3000 away from the arm assembly 4000 to de-couple the display assembly tongue 3020 from the orientation grooves 4020A, 4020B. Simultaneously, the pivot joint slides through the pivot joint slot 3010 (FIG. 28). The user may then turn the display assembly 3000 about the pivot joint 4010, simultaneously slide the display tongues into the desired orientation grooves 4020A or 4020B and the pivot joint 4010 through the pivot joint slot 3010, and re-engages the display latch 3030 with either latch groove 4030A or 4030B.

In aspects, the supplemental computing display assembly 10' may include a rotation stopper system (not shown) configured to prevent rotation of the display assembly more than a desired degree of rotation. The rotation stopper system includes a stopper and a stopper receiver. The stopper may be a tab, dome, or other mechanism configured to engage a stopper receiver such as a trench or cavity. The stopper receiver is configured to prevent rotation of the display assembly beyond that allowed and defined by the rotation system. For example, the rotation stopper system may include a trench in the form of an arc between 0 degrees and 270 degrees. In another example, the rotation stopper system may prevent rotation beyond 90 degrees. The stopper receiver may be disposed on the display assembly and the stopper on the arm assembly, or vice-versa.

With continuing reference to FIGS. 24-30C, the arm assembly 4000 is further coupled at one end to a hinge assembly 5000. The hinge assembly 5000 allows the display assembly 3000 to be rotated towards a perpendicular orientation or a parallel orientation when the display assembly 3000 is extended out of the display housing 2000. The hinge assembly 5000 may include a single elongated hinge or multiple distinct hinges. The hinge assembly 5000 may be configured to allow 90-degree forward rotation, 180-degree rearward rotation, and any angle therebetween.

Referring to FIGS. 30A-C, the display assembly 3000, arm assembly 4000, and hinge assembly 5000 are configured to slide along a display housing rail system 2010. The display assembly 3000A includes recesses 3040 along horizontal edges of the display assembly configured to slidably mate with the display house rail system 2010. The arm assembly 4000 is configured to align with the horizontal edges 3042 as shown in FIG. 25.

The hinge assembly 5000 is configured to slide along the display housing rail system 2010. The display assembly 3000 and arm assembly 4000 are configured to travel along and out of the display housing 2000, but the hinge assembly 5000 is configured to travel along display housing rail system 2010 without exiting the display housing 2000. When extended out, the display assembly 3000 and arm assembly 4000 are thereby held by the hinge assembly 5000 in the display housing 2000.

Hinge assembly 5000 may include a trolley 5010, a rod 5020, and at least one hinge 5030. The trolley 5010 is coupled at an end thereof to a pivot bearing 5012 via a joint 5016. The trolley 5010 is coupled to a rod 5020. The rod 5020 includes a pivot bearing housing 5022 surrounding a pivot bearing 5012. A pivot bearing cap 5014 secures the pivot bearing 5012 within the pivot bearing housing 5022 disposed at an end of the rod 5020. The rod 5020 is coupled at an opposite end thereof to the at least one hinge 5030. In aspects, the bearings may be O-rings configured to slide relative to one another about a central axis. In aspects, the rod may include O-rings configured to slide relative to one another to permit rotation of the rod.

The trolley 5010 is configured to slide along the display housing rail system 2010. The display housing rail system 2010 may be a "C" shaped channel, as shown in FIG. 30C. The trolley 5010 may be configured to surround a portion of the "C" shaped channel. The trolley 5010 is prevented from being pulled or pushed out an end of the display housing 2000 via rail stops 2012 disposed at ends of each rail of the display housing rail system 2010. The rail stops 2012 protrude past an arm 5018 of the trolley 5010, thus preventing trolley 5010 from leaving the rail.

The rod 5020 is configured to rotate about the pivot bearing 5012 via the bearing housing 5022. When rod 5020 rotates about the pivot bearing 5012, and the hinge 5030 rotates in the same direction when rod 5020 is rotated. A user would rotate the display assembly 3000 and arm assembly 4000 forward or backward, thus rotating the hinge 5030 and rod 5020.

The display assembly 3000 includes a display 3050. The display 3050 is seated within display retaining clips 3052 (FIGS. 27-28). When the display assembly 3000 is retracted into a bay 2020 of the display housing 2000, the display 3050 faces the portable computing device 50. When the display assembly 3000 is extended out of the display housing 2000, the display 3050 faces the user of the portable computing device. Hinge assembly 5000 allows the user to orient the additional display provided by the supplemental computing display assembly 10' as desired.

In aspects, the display 3050 may be a cathode ray tube (CRT), a liquid crystal display (LCD), or a light-emitting diode (LED). In aspects, the display 3050 may be a thin film transistor liquid crystal display (TFT-LCD). In aspects, the display 3050 may be an organic light-emitting diode (OLED) display. In various aspects, the OLED display is a passive-matrix OLED (PMOLED) or active-matrix OLED (AMOLED) display. In aspects, the display 3050 may be a plasma display. In aspects, the display 3050 may be a video projector. In aspects, the display may be interactive (e.g., having a touch display or a sensor such as a camera, a 3D sensor, a LiDAR, a radar, etc.) that can detect user interactions/gestures/responses and the like. In still other aspects, the display 3050 is a combination of devices such as those disclosed herein.

A kickstand (not shown) similar to kickstand 400 may be provided on the rear of display housing 2000, and configured to swing outward and rest at an angle on a surface, such as a table or desk, to provide additional support for the supplemental computing display assembly 10'. In aspects, only the most rearward display housing 2000 or all display housings 2000 include a kickstand. In aspects, the kickstand may be coupled to the main housing 1000. In other aspects, stands (not shown) may be coupled to the display housings 2000 such that the supplemental computing display assembly 10' may stand upright without coupling to a portable computing device 50. In aspects, the kickstand may be extendable. In aspects, the kickstand may couple to any component of the supplemental computing display assembly 10 or 10' via coupler assemblies 7000 and pushpins 7010, 7012, described in more detail below, and this be detachable from the supplemental computing display assembly 10 or 10'. In aspects, monitor stands may similarly be configured to couple to the display assemblies 3000 or display housings 2000 via coupler assemblies 7000.

Figure 31:
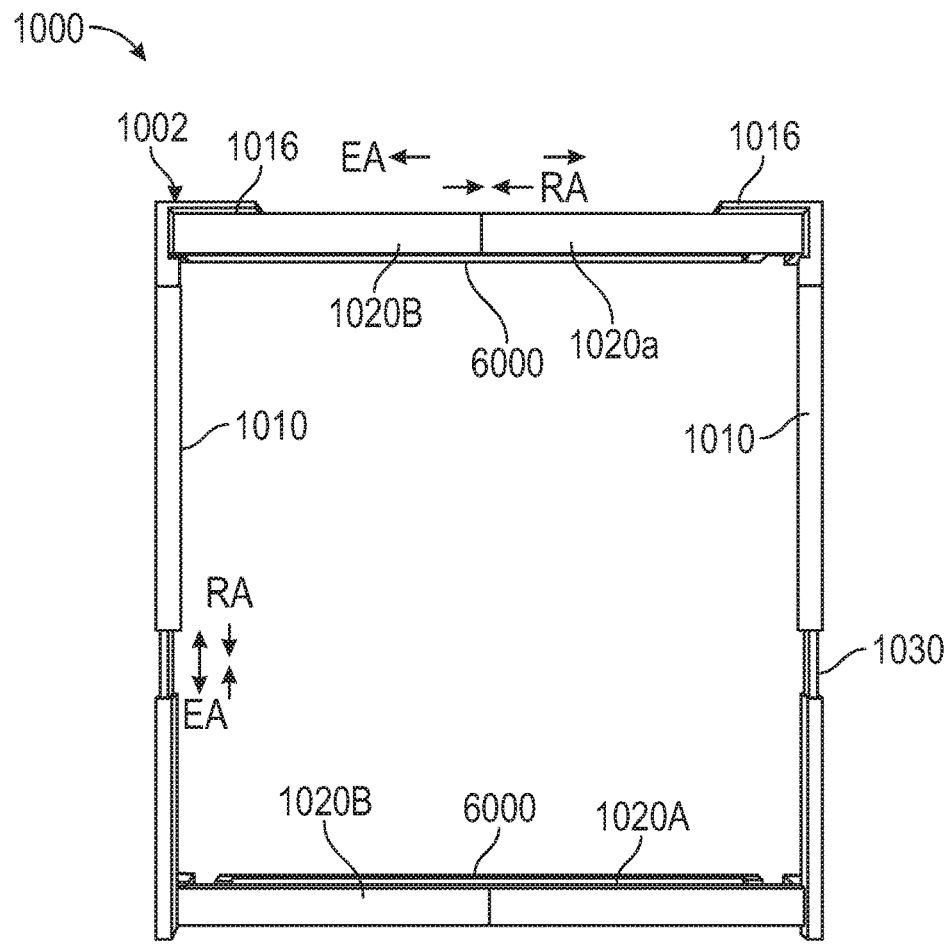
FIG. 31 is a perspective view of the main housing of the supplemental computing display assembly of FIG. 17.

Referring to FIG. 31, the main housing 1000 is configured to extend and or retract about a portable computing device 50 so that the coupling arm latches 1010 can be fitted to a larger display of the portable computing device 50. Coupling arm latches 1010 are vertically oriented with respect to a display of the portable computing device 50. Coupling arm latches 1010 are each coupled to a main housing rail 1030 configured to allow the coupling arm latches 1010 to extend vertically from a default position (not shown).

Figure 19:
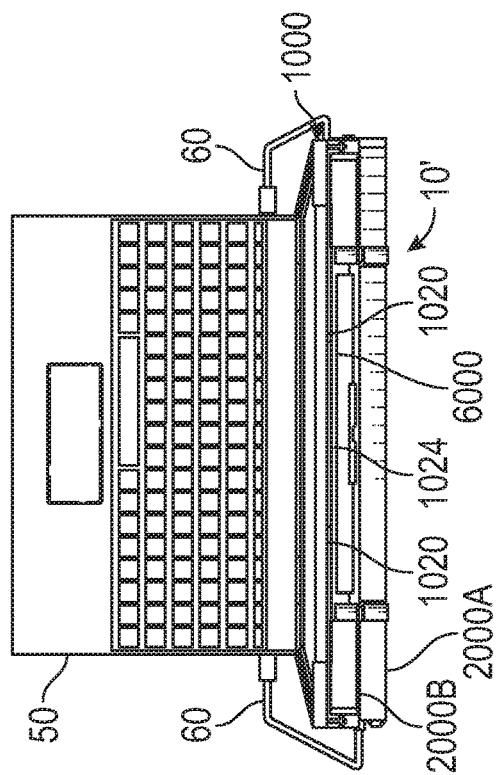
FIG. 19 is a top view of the supplemental computing display system of FIG. 17.

Housing supports 1020 are coupled at one end to an end of the coupling arm latches 1010 and form horizontal supports for the main housing 1000. The rack gear 6000 is coupled to rear sides of the housing supports 1020 of the main housing 1000. The rack gear 6000 is configured to allow the housing supports 1020 to extend horizontally to fit a longer monitor of a portable computing device 50. For example, as illustrated in FIG. 19, housing supports 1020 are in an extended position relative to the rack gear 6000 such that there is a housing support gap 1024 between two housing supports 1020 at a top portion of the main housing 1000, such that the main housing 1000 fits about a larger display of the portable computing device 50.

With continuing reference to FIG. 31, in a default position, the main housing 1000 is fully retracted such that coupling arm latches 1010 are adjacent each other about a middle vertical portion of the main housing 1000 as indicated by retraction arrows RA. Similarly, housing supports 1020 are in a default position when they are adjacent to each other about a middle horizontal portion of the main housing 1000 as indicated by retraction arrows RA. When the main housing 1000 is in a first extended position, the coupling arm latches 1010 extend vertically along main housing rail 1030 to fit about a larger display of a portable computing device 50 as indicated by extension arrows EA. When the main housing 1000 is in a second extended position, the housing supports 1020 extend horizontally as indicated by extension arrows EA. In aspects, the main housing may be in the first and second extended positions simultaneously, as illustrated in FIG. 20, or separately extended into the first and second positions.

Main housing 1000 may be about five inches by five inches in a default configuration or ten inches by ten inches in a default configuration. The main housing 1000 may extend to about twenty inches in the horizontal or vertical direction in extended configurations. In aspects, the main housing 1000 is configured to grasp a ten-inch display of a portable computing device in a first extended configuration and extend to grasp an eighteen-inch display of a portable computing device in a second extended configuration. For example, as shown in FIG. 20, the main housing 1000 may be in a first extended configuration to grasp, for example, a small-sized tablet, and, as shown in FIG. 21, the main housing 1000 may be in a second extended configuration to grasp a large monitor of a laptop computer.

In aspects, housing supports 1020 may be configured to slidably engage coupling arm latches 1010 to permit upward or downward movement of the housing supports 1020 so as to contract the main housing 1000 separate from main housing rail 1030, thus enabling the main housing to engage personal computing devices 50 that are smaller than the default configuration of the main housing 1000 when the coupling arm latches 1010 are fully contracted. For example, upper retainer clips 1016 may be slidably coupled to main housing coupling arm latches 1010 and are configured to, independently of track 1030, move up or down a track disposed on coupling arm latches 1010. The main housing supports 1020 coupled to the upper retainer clips 1016 are thereby able to slide down the coupling arm latches 1010 to engage a display of smaller personal computing devices.

Figure 32:
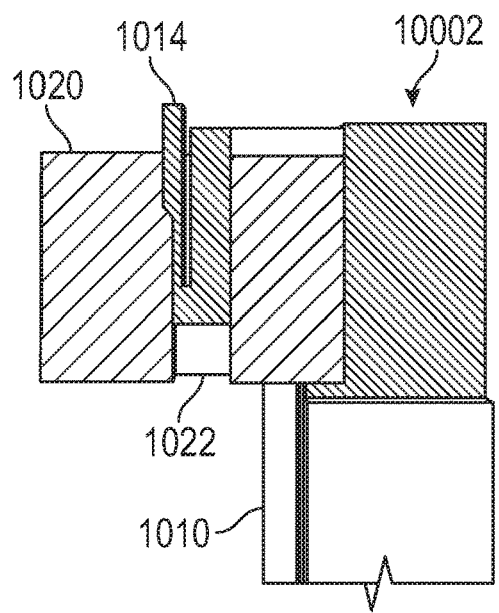
FIG. 32 is a side, sectional view of an exemplary corner of the main housing of the supplemental computing display assembly of FIG. 17.
Figure 33:
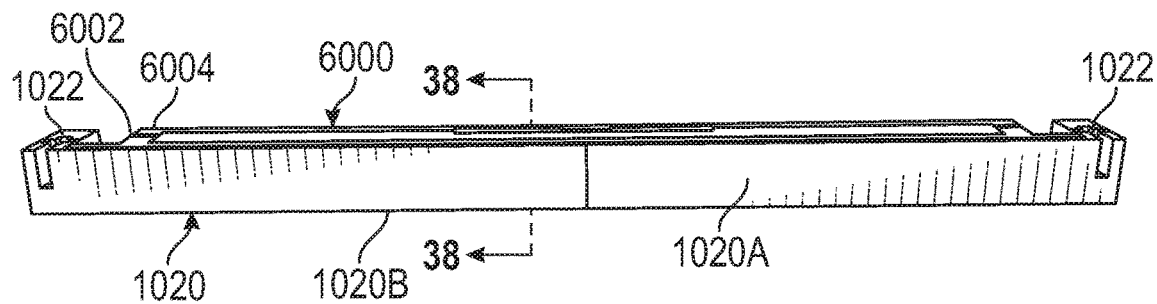
FIG. 33 is a front perspective view of housing supports of the main housing coupled to a gear assembly of the supplemental computing display assembly of FIG. 18.
Figure 34:
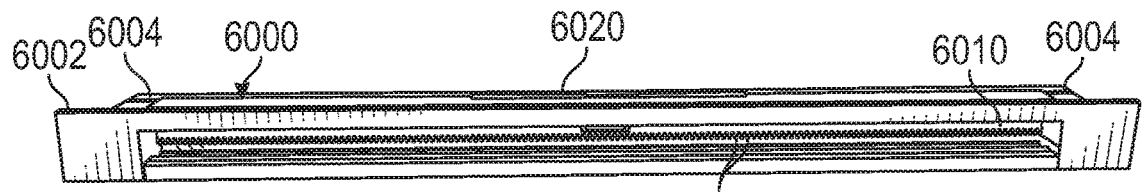
FIG. 34 is a front perspective view of a gear assembly of the supplemental computing display assembly of FIG. 17.
Figure 35:
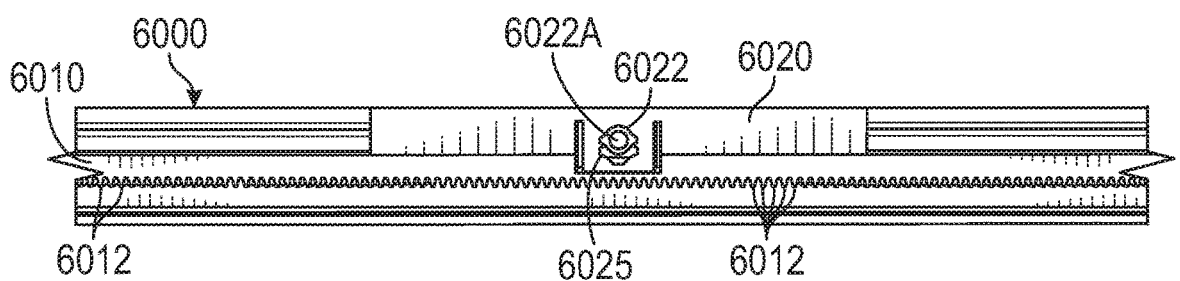
FIG. 35 is the front view of the gear assembly shown in FIG. 34 illustrating a linear gear and gear latch mechanism.

With reference to FIG. 32, a section view of the upper right corner 1002 of the main housing 1000, as viewed from the rear, illustrates the coupling arm latches 1010 coupled to the housing supports 1020 at respective ends thereof. The coupling arm latches 1010 include at each end thereof retainer clips 1014 that clip into retainer clip receptacles 1022 at each end of a housing support 1020 (see FIG. 33). The coupling arm latches 1010 and housing supports 1020 are similarly coupled to each other at each corner of the main housing 1000. In aspects, the coupling arm latches 1010 and housing supports 1020 may be coupled to each at respective ends thereof in any appropriate manner, known to those of ordinary skill in the art, for example, via ultrasonic welding or high strength glue.

Figure 36:
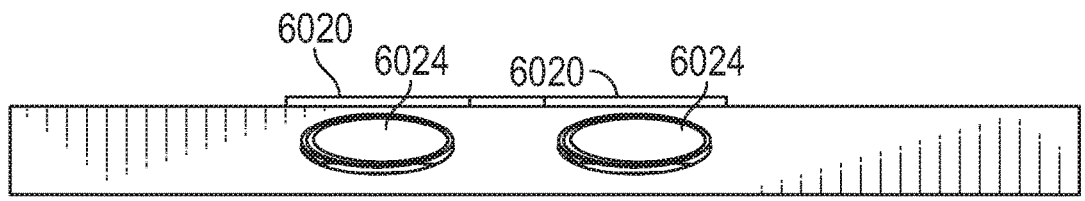
FIG. 36 is a rear view of the gear assembly shown in FIG. 34 illustrating the notches of the gear latch mechanism in an unlocked position.
Figure 37:
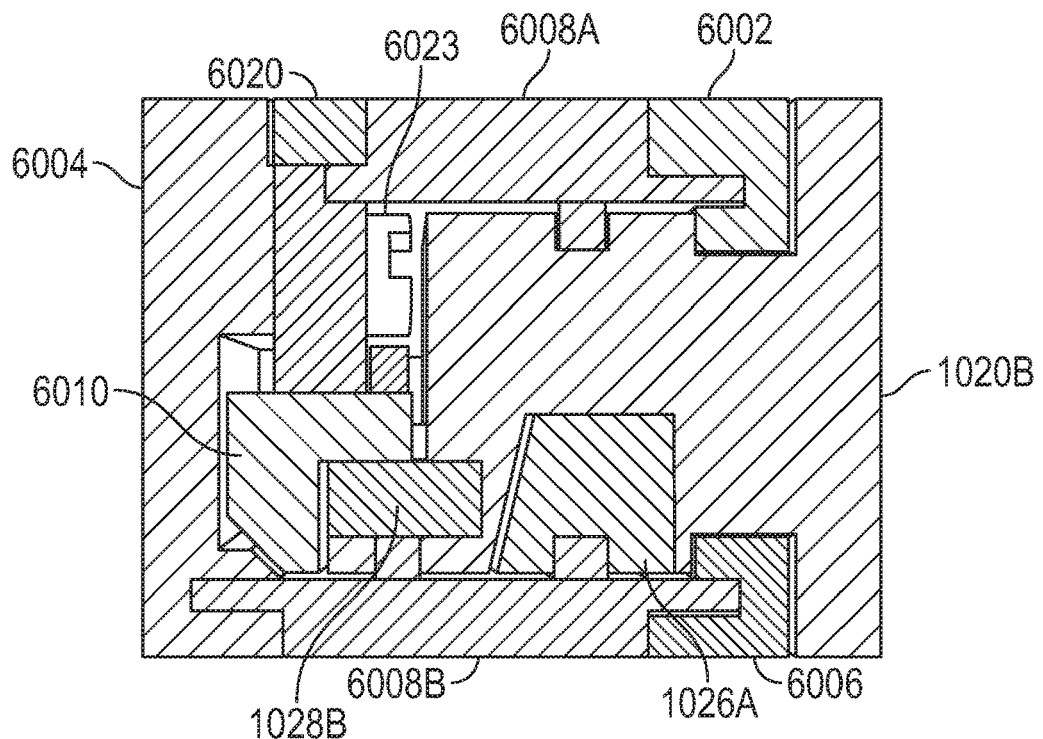
FIG. 37 is a sectional view of FIG. 33 illustrating the housing supports and gear assembly coupled thereto, with the gear latch mechanism of the gear assembly in a locked position.
Figure 38:
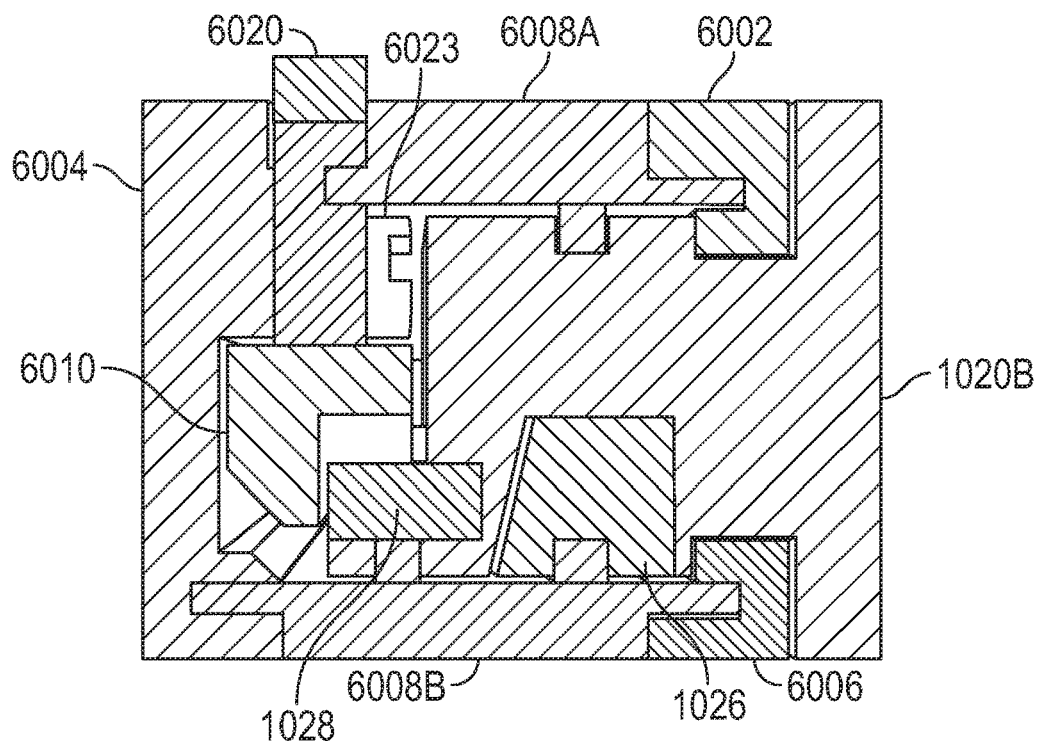
FIG. 38 is a sectional view of FIG. 33 illustrating the housing supports and gear assembly coupled thereto, with the gear latch mechanism of the gear assembly in an unlocked position.

With reference to FIGS. 33-39, a first housing support 1020A and a second housing support 1020B are coupled to the rack gear 6000 such that each housing support 1020A and 1020B cover a half of the rack gear 6000 when the main housing support is not in an extended position. Rack gear 6000 includes top front rack gear frame 6002 (FIG. 33), a rear rack gear frame 6004 including a latch 6022 disposed thereon, a bottom front rack gear frame 6006 (FIG. 38), top track 6008A, bottom track 6008B, a linear gear 6010 (FIG. 35), and a gear latch mechanism 6020 (FIG. 36). The gear latch mechanism 6020 includes at least one notch 6024 (FIG. 35) and a latch receiver port 6025 configured to receive latch 6024. The latch 6022 may be a knob or column with an internal cavity 6022a (FIG. 35) configured to receive a retaining device, such as screw 6023 (FIGS. 37 & 38).

The top front rack gear frame 6002 is coupled to the rear rack gear frame 6004, and bottom front rack gear frame 6006. The top and bottom tracks 6008A, 6008B are disposed between the top front rack gear frame 6002, rear rack gear frame 6004, and bottom front rack gear frame 6006, thereby defining a pocket between the components (see FIG. 37). The linear gear 6010 is disposed behind the top front rack gear frame 6002 within the pocket. The linear gear 6010 includes teeth 6012.

With reference to FIGS. 36-38, housing supports 1020A, 1020B have corresponding teeth (not shown) disposed on rear portions thereof on housing support gear blocks 1028 coupled thereto that mesh with the teeth 6012 of the linear gear 6010. The gear latch mechanism 6020 is configured to, and may be coupled to, move the linear gear 6010 upwards so that the teeth 6012 are not meshed with the teeth of the housing support gear blocks 1028, and the gear latch mechanism 6020 is configured to move the linear gear 6010 downward so as to re-engage the teeth 6012 of the linear gear 6010 with the teeth of housing support gear blocks 1028. FIGS. 37 and 38 are sectional views illustrating the manner in which the linear gear 6010 via the gear latch mechanism 6020 engages the teeth disposed on the housing support gear block 1028B of housing support 1020B. Housing support 1020A with a corresponding housing support gear block similar (not shown) to housing support gear block 1028B is similarly configured.

Housing supports 1020A and 1020B may be moved independently of one another. Additionally, the housing supports 1020A and 1020B are each configured to slide along the top and bottom tracks 6008A, 6008B. In aspects, housing supports 1020A, 1020B include housing support branches 1026 coupled thereto configured to slide along the top or bottom tracks 6008A, 6008B. The housing support branches 1026 of each housing support 1026A, 1026B are configured to extend within one opposite housing supports 1026A, 1026B. For example, as illustrated in FIGS. 37 and 38, housing support 1026A slides within housing support 1020B along the bottom track 6008B.

The housing support branch of housing support 1020B is configured to slide within housing support 1020A along the top track 6008A (FIG. 37). While FIGS. 38 and 39 are illustrated to show sectional views of the interactions between housing support 1020B and the linear gear 6010, housing support 1020A would similarly interact with the linear gear 6010. Aspects illustrated and described above regarding the configuration of the housing support 1020B, housing support gear blocks 1028B, housing support 1026A, and top and bottom tracks 6008A, 6008B, is illustrated in FIGS. 37 and 38, similar configurations would apply to housing support 1020A, housing support gear blocks of housing support 1020A, housing support 1026B, and top and bottom tracks 6008A, 6008B.

Returning to FIG. 36, a user may push up on the notch 6024 disposed on the gear latch mechanism 6020 to move the gear latch mechanism 6020 up in order to disengage the rack gear 6000 from the housing supports 1020 (see FIG. 23). The latch receiver port 6025 is configured to accept the latch 6022 such that the latch 6022 may hold the gear latch mechanism 6020 up or down, or unlocked or locked, respectively. When the gear latch mechanism 6020 is moved up, and therefore the latch 6022 is positioned in a lower portion of the latch receiver port 6025, the linear gear 6010 coupled thereto disengages from the main housing supports 1020. When the gear latch mechanism 6020 is moved down, and therefore the latch 6022 is positioned in an upper portion of the latch receiver port 6025, the linear gear 6010 engages the main housing supports 1020. The latch 6022 locks the hear latch mechanism in place. While the latch 6022 and gear latch mechanism 6020 are discussed and shown in the figures, it is envisioned that one of ordinary skill in the art may devise a variety of mechanisms for locking and unlocking or coupling and decoupling the linear gear from the main housing supports 1020.

When a user unlocks the gear latch mechanism 6020, or moves the gear latch mechanism 6020 up, a user may then slide housing supports 1020 relative to the rack gear 6000 and therefore extend the main housing 1000 to fit over a desired portable computing device. The user may then push the notch 6024 down to snap the latch receiver port 6025 onto the latch 6022 to engage the teeth 6012 of the linear gear 6010 with the teeth of the housing support gear blocks 1028. Thus, the main housing 1000 may be sized to grip a portable computing device 50. In aspects, a spring or other tension or compression device may be coupled to or disposed within the rack gear 6000 to provide additional assistance to the main housing 1000 in gripping a portable computing device 50.

In aspects, the notch 6024 may instead be a bar, button, or other mechanism for facilitating movement of the linear gear 6010 as can be envisioned by those of ordinary skill in the art.

The screw 6023 is configured to engage the latch 6022 and maintain the latch 6022 within the latch receiver port 6025 of the gear latch mechanism 6024.

With reference to FIG. 39, the top front rack gear frame 6002 includes pushpins 7012, described in more detail hereinbelow, near distal ends of the rack gear 6000 protruding rearward.

Figure 40:
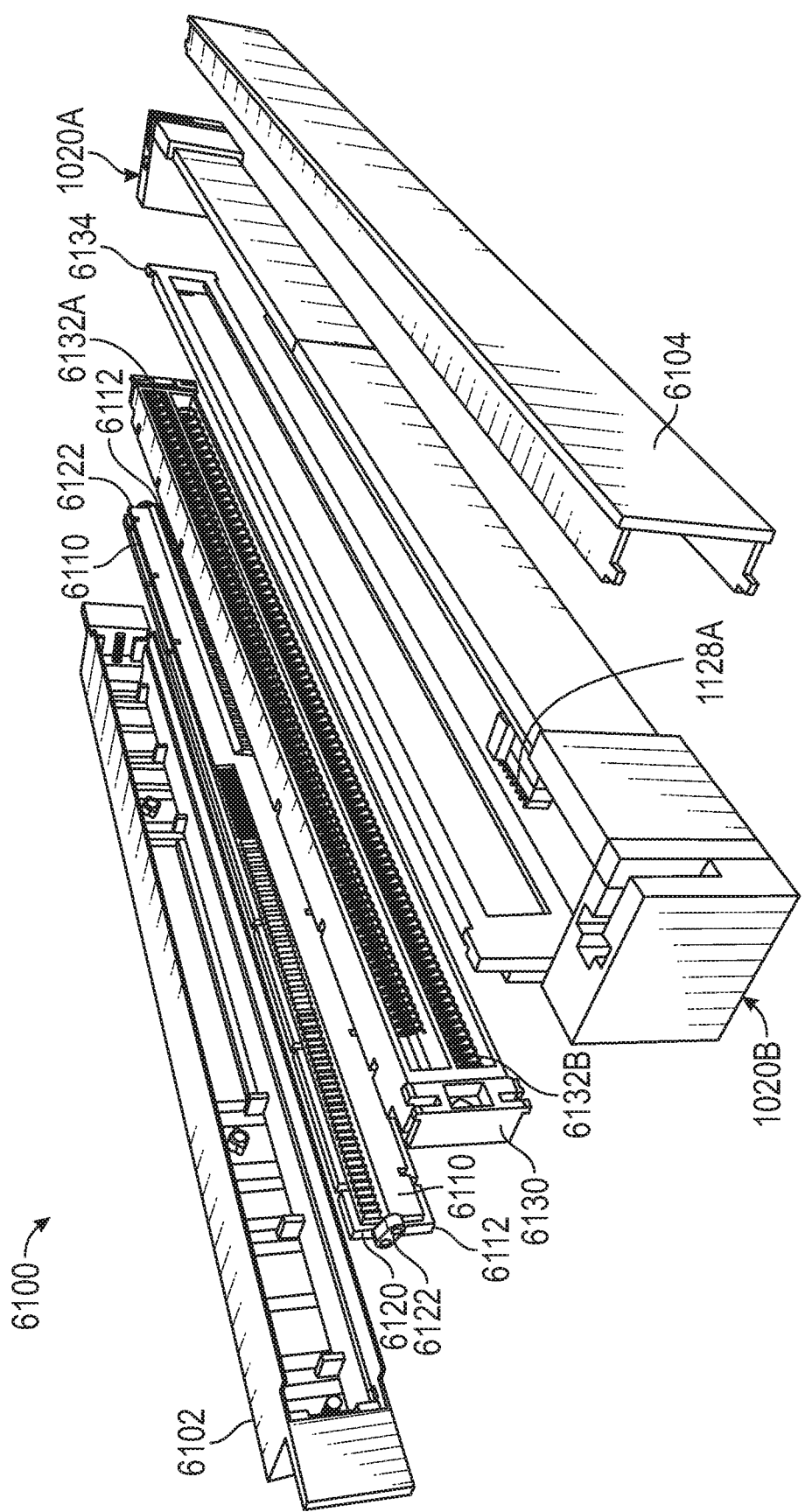
FIGS. 40-41 are exploded isometric views illustrating an alternate gear assembly of the supplemental computing display assembly of FIG. 17.
Figure 41:
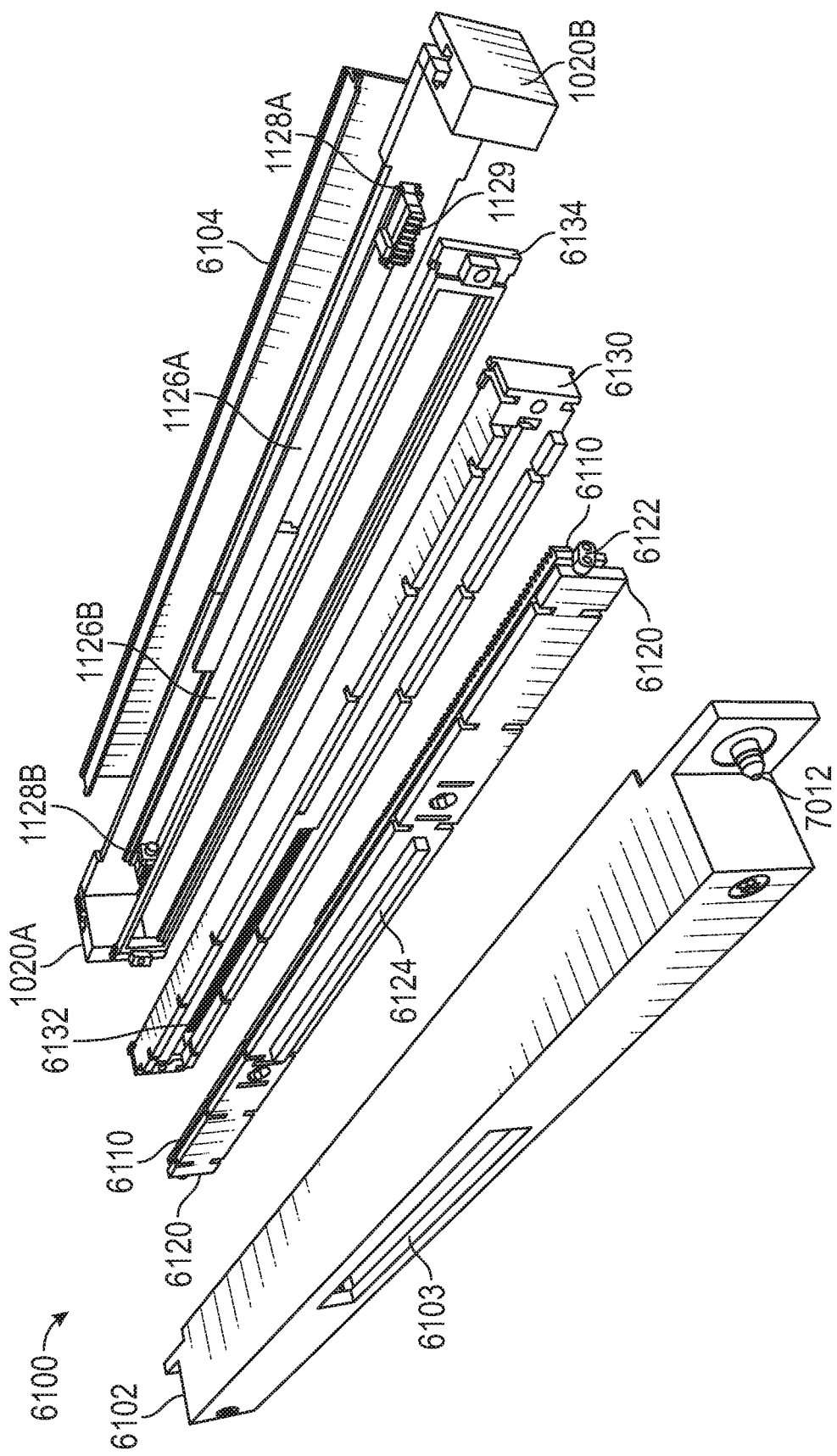

With reference to FIGS. 40-41, in another aspect, rack gear 6100 may be substituted for rack gear 6000. FIG. 40 illustrates an exploded front isometric view of rack gear 6100. FIG. 41 illustrates an exploded rear isometric view of rack gear 6100. Rack gear 6100 operates similarly to rack gear 6000 and is configured to permit extension of housing supports 1020 of the main housing 1000. Rack gear 6100 includes a gear housing 6102, a gear housing cover 6104, a linear gear 6110, a gear latch mechanism 6120, and a tensioner 6130.

Gear housing 6102 is configured to define a pocket or housing to hold the other components of the rack gear 6100. Gear housing cover 6104 is configured to cover gear housing 6102 when the components of the rack gear 6100 are assembled therein.

The gear latch mechanism 6120 is disposed in the rear of the gear housing 6102, followed by the linear gear 6110 coupled thereto. The linear gear 6110 is coupled to the gear latch mechanism 6120 via a coupling bar 6122. Linear gear 6110 may be coupled to the gear latch mechanism 6120 via any manner sufficiently configured to move the linear gear vertically as is known by those of ordinary skill in the art.

The tensioner 6130 includes a spring 6132 disposed therein and a cover 6134 to keep the spring 6132 inside the tensioner 6130. In aspects the tensioner 6130 includes at least two springs, such as springs 6132A, 6132B. The tensioner 6130 is disposed adjacent the linear gear 6110 in the gear housing 6102. Housing supports 1020A, 1020B are in communication with the linear gear 6110 and tensioner 6130. The gear housing cover 6104 couples to the gear housing 6102 and is configured to keep the components of the rack gear 6100 within the gear housing 6102.

With continuing reference to FIGS. 40 and 41, housing supports 1020A, 1020B include housing support branches 1126A, 1126B, respectively. Housing support gear blocks 1128A, 1128B are disposed at ends of the housing support branches 1126A, 1126B, respectively. Housing support gear blocks 1128A, 1128B include teeth 1129 disposed thereon, and are configured to mesh with teeth 6112 of the linear gear 6110. The gear blocks 1128A, and 1128B are configured to pass through the tensioner 6130 so that the gear blocks 1128A and 1128B may communicate and mesh with the linear gear teeth 6112 of the linear gear 6110.

The housing support gear blocks 1128A, 1128B are configured to be in contact with springs 6132A, 6132B of the tensioner 6130, respectively. The springs 6132A, 6132B distally push on the housing support gear blocks 1128A, 1128B, respectively, thereby pulling housing supports 1020A, 1020B proximally, thus providing extra force for the main housing 1000 to grip a portable computing device 50, as similarly described above with reference to rack gear assembly 6000. For example, if housing support 1020B is distally extended, spring 6132B would push on housing support gear block 1128B. Since 1128B is connected to housing support 1020B, the spring 6132B would proximally pull housing support 1020B, providing tension to the main housing 1000 when extended around a portable computing device 50.

Gear latch mechanism 6120 includes a switch bar 6124 that is configured similar to notch 6024 and latch 6024 and is disposed in gear housing slot 6103 when gear latch mechanism 6120 is disposed in gear housing 6102. Switch bar 6124 allows a user to actuate gear latch mechanism 6120. When switch bar 6124 is moved up, the linear gear teeth 6112 of linear gear 6110 disengage the teeth of housing support gear block 1128, and when switch bar 6124 is moved down, linear gear 6110 re-engages with housing supports 1020 via the gear block 1128.

Gear housing 6102 includes one-directional pushpins 7012 protruding rearward from the gear housing 6102. The one-directional pushpins 7012 are configured to couple to a coupler assembly 7000 discussed below.

Figure 42:
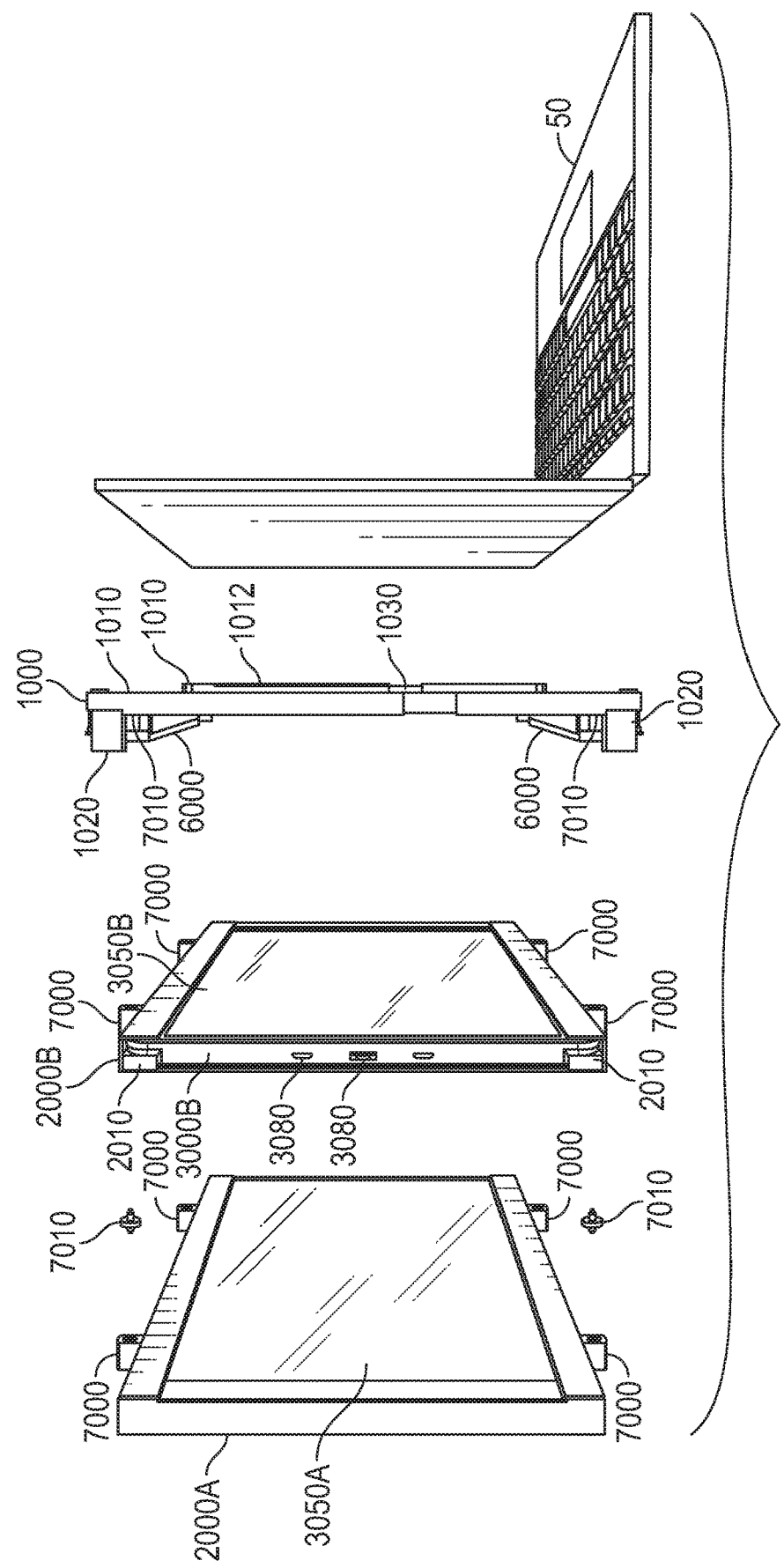
FIG. 42 is an exploded side view of the supplemental computing display assembly of FIG. 17.

With reference to FIG. 42, an exploded isometric side view of the supplemental computing display assembly 10' illustrates the manner in which the main housing 1000, and display housings 2000A, 2000B, couple to each other. At least two coupler assemblies 7000 disposed on each display housing 2000A, 2000B permit coupling the display housing 2000A, 2000B to each other, and the main housing 1000. The coupler assemblies 7000 may be disposed on a top and/or a bottom surface of the display housing and/or the main housing 1000

Figure 43:
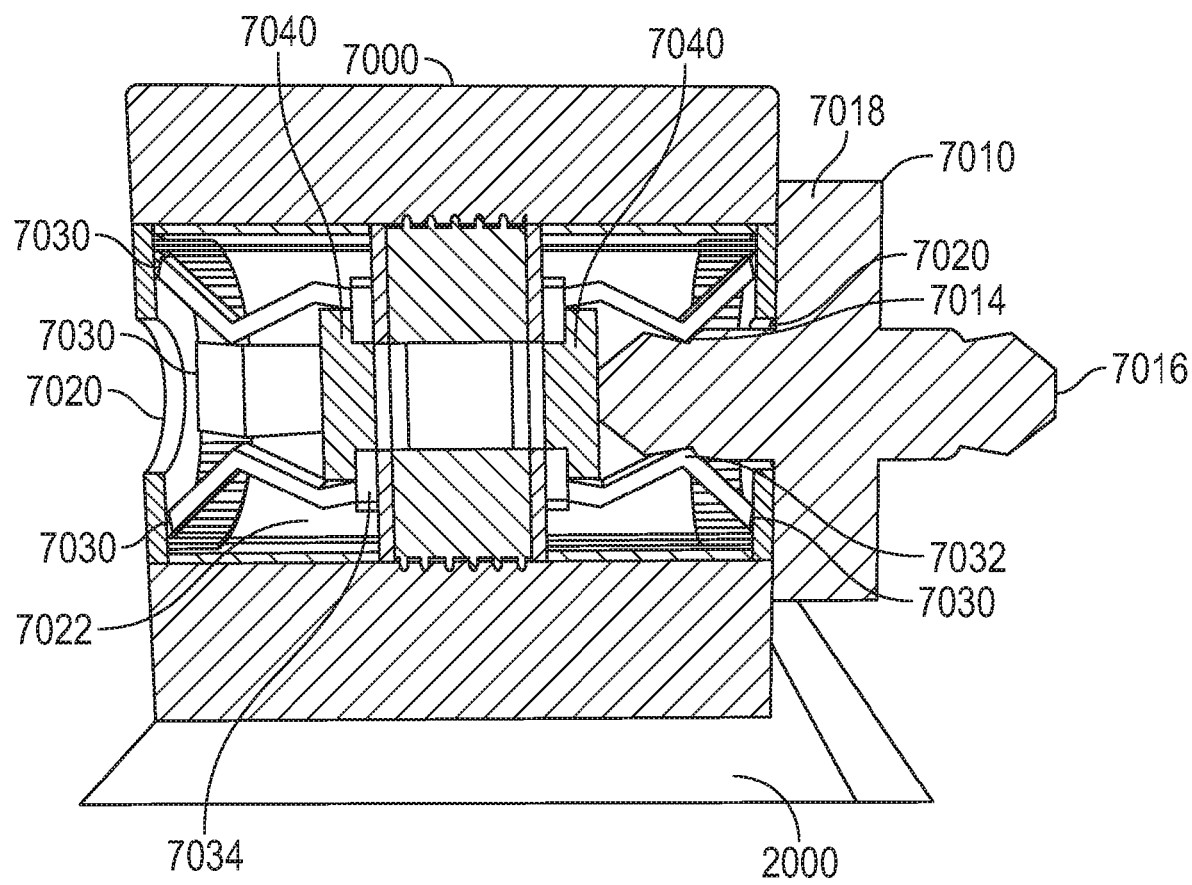
FIG. 43 is a sectional view of a coupler assembly of the supplemental computing display assembly of FIG. 17.

With reference to FIG. 43, the coupler assemblies 7000 include pushpin receptacles 7020, spring clips 7030, and spring clip retainers 7040. The pushpin receptacles 7020 are configured to receive pushpins such as bi-directional pushpin 7010 or one-directional pushpins 7012. The spring clips 7030 are retained within the pushpin receptacles 7020 by the spring clip retainers 7040 which are configured to hold an end 7034 of the spring clips 7030. In aspects, each pushpin receptacle 7020 includes at least four spring clips 7030 arranged circumferentially within the pushpin receptacle 7020. The coupler assemblies 7000 may include one or two pushpin receptacles 7020 to allow objects, components, such as multiple display housings 2000 and a main housing 1000 to be coupled to one another, as shown in FIG. 43.

Bi-directional pushpins 7010 may have pinheads 7016 on each side of a spacer 7018. Pushpins 7012, such as those shown on the rack gear assembly 6000 in FIGS. 39 and 40, may have only one pinhead 7016 on one side of a spacer 7018. The one-directional pushpins 7012 may be coupled to a variety of objects on the empty side of the spacer 7018, such as main housing 1000, display housing 2000, rack gear assembly 6000, kickstand 400, monitor stands, housing stands, extension arms configured to allow the main housing to couple to larger or smaller personal computing devices than the default main housing or extended main housing configuration permits, or other accessories, such as a lamp, clipboard, webcam or any other item that a user may want to couple to an object using coupler assemblies 7000.

The spring clips 7030 are configured to grasp and retain pushpins 7010, 7012 within the pushpin receptacle 7020 when the pushpins 7010, 7012 are inserted therein. When initially inserted, a tip of the pushpin forces the spring clips 7030 outward so as to push the free ends of the spring clips 7030 toward walls 7022 of the pushpin receptacles 7020. As the pushpins 7010, 7012 are further inserted into the pushpin receptacles 7020, an elbow 7032 of the spring clips 7030 slide into an inclined pocket 7014 of the pushpins 7010, 7012. This causes the free ends of the spring clips 7030 to relax and disengage from the pushpin receptacle 7020. The pushpins 7010, 7012 are then held in place by the spring clips 7030. In aspects the pinheads 7016 may be cylindrical or prismatic with inclined pockets configured to accept the spring clips 7030. To disengage the pushpins 7010, 7012 from the pushpin receptacle, a user must apply sufficient force to overcome the compression forces applied to the pushpins 7010, 7012 by the spring clips 7030 as the elbow 7032 of the spring clips 7030 leaves the inclined pocket 7014. In aspects, any clip configured to maintain grasp of a pushpin 7010, 7012 may be used.

Coupler assemblies 7000 may be disposed on a variety of objects or components. The coupler assemblies allow for objects and components, such as multiple display housings 2000, to couple to one another to form a chain of coupled objects. In aspects, any number of items may be coupled together using successive coupler assemblies 7000 and pushpins 7010, 7012.

Figure 44:
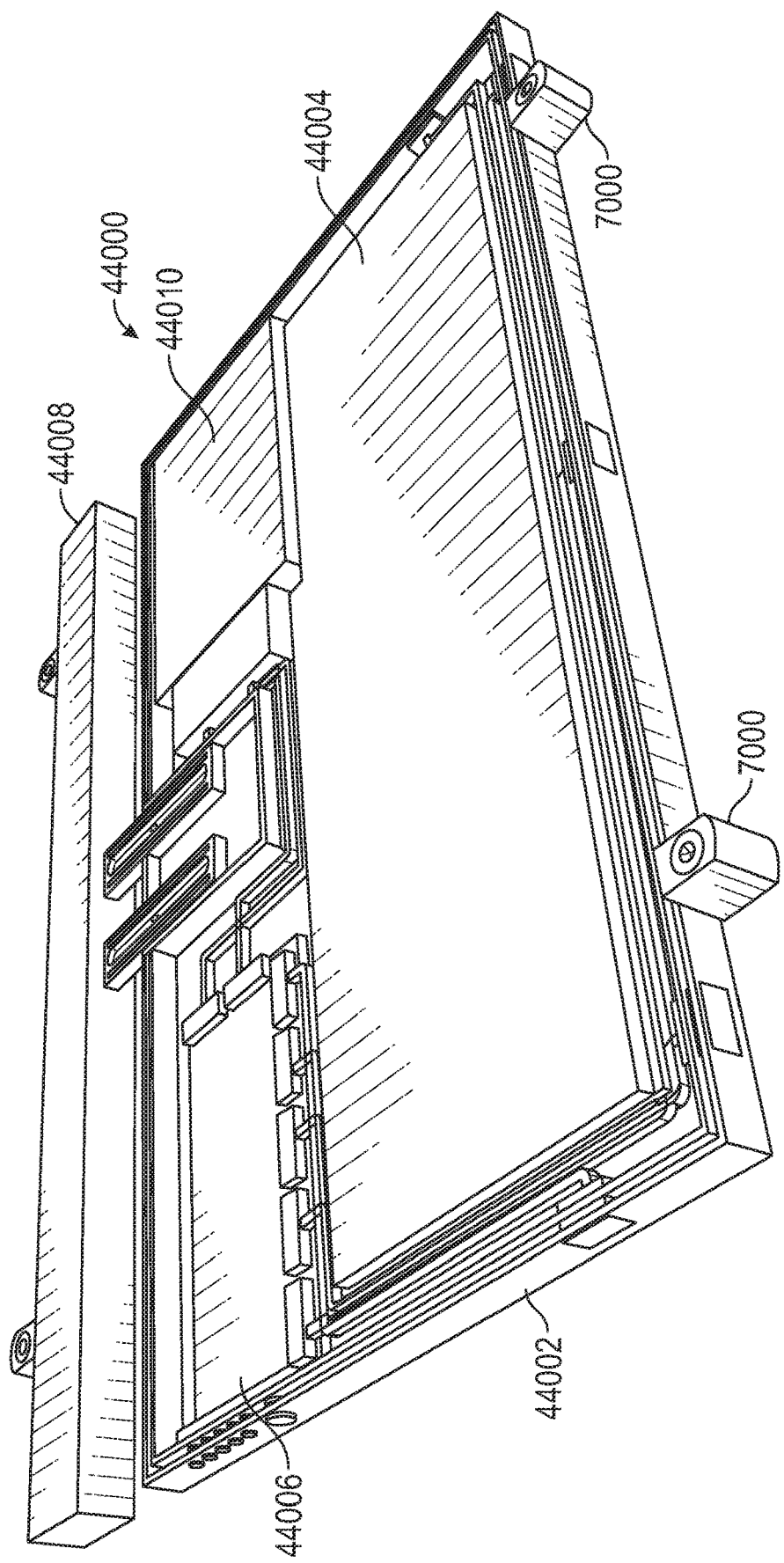
FIG. 44 is an exploded perspective view of an accessory assembly of the supplemental computing display assembly of FIG. 17.

With reference to FIG. 44, an accessory assembly 44000 is shown. The accessory assembly 44000 generally includes an accessory housing 44002, a housing arm 44008, and coupler assemblies 7000. The housing arm 44008 may be slidably coupled to the accessory housing 44002. In aspects, the accessory assembly 44000 may include a docking station 44006. The accessory assembly 44000 may be coupled to the display housing(s) 2000 having a display assembly 3000 or a main housing 1000 using coupler assemblies 7000. In aspects, the accessory assembly may include an expandable computer readable storage devices 44010, such as a hard disk drive, solid state drive, or the like or may include a bay for housing such storage devices within the accessory assembly.

In aspects, the accessory assembly 44000 may house a battery system 44004. The battery system may be coupled to a USB peripheral docking station 44006. The docking station 44006 may include ports from a list including, but not limited to, HDMI port, USB, ethernet, USB-C, Thunderbolt, DisplayPort, mini-DisplayPort, micro-USB, and the like.

The various aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements and techniques that are insubstantially different from those described above and/or in the appended claims are also intended to be within the scope of the disclosure.

What is claimed is:

1. A supplemental computing display assembly for selective attachment to a portable computing device having a first display, the supplemental computing display assembly comprising:
   a main housing configured for selective attachment to the portable computing device;
   a first arm assembly secured to the main housing; and
   a second display assembly operatively coupled to the first arm assembly and including a second display configured to communicate with the portable computing device, the second display positionable adjacent to the first display to act as an additional display for the portable computing device when the main housing is attached to the portable computing device, wherein the second display is selectively movable relative to the main housing between a landscape orientation and a portrait orientation,
   wherein the first arm assembly includes:
      a pivot joint configured for orienting the first display between a landscape orientation and a portrait orientation, the pivot joint including:
         a pivot joint column configured to slidably engage the display assembly;
         a spring washer configured to hold the pivot joint within a pivot joint slot of the second display assembly; and
         a retainer head coupled to the pivot joint column and configured to retain the pivot joint column within the pivot joint slot.

2. The supplemental computing display assembly of claim 1, further comprising:
   a second arm assembly secured to the main housing; and
   a third display assembly operatively coupled to the second arm assembly and including a third display configured to communicate with the portable computing device, the third display positionable adjacent to the first display to act as a third additional display for the portable computing device when the main housing is attached to the portable computing device, wherein the third display is selectively movable relative to the main housing between a landscape orientation and a portrait orientation, independently from the second display assembly.

3. The supplemental computing display assembly of claim 2, wherein the second display assembly is extended and positioned in a portrait orientation when the third display assembly is extended and positioned in a landscape orientation.

4. The supplemental computing display assembly of claim 2, wherein the main housing includes a first coupler assembly,
   wherein the second display assembly includes a display housing configured to house the second display, wherein the display housing includes a second coupler assembly configured to couple to a pushpin of a second coupler assembly.

5. The supplemental computing display assembly of claim 4, wherein the first coupler assembly includes:
   a push pin receptacle configured to receive the push pin;
   a spring clip configured to hold the coupled push pin in place; and
   a spring clip retainer configured to retain the spring clip.

6. The supplemental computing display assembly of claim 4, wherein the first arm assembly is configured to extend or retract the second display assembly from the display housing.

7. The supplemental computing display assembly of claim 1, further comprising a kickstand.

8. The supplemental computing display assembly of claim 4, further comprising an accessory assembly coupled to at least one of the main housing or the display housing.

9. The supplemental computing display assembly of claim 8, wherein the accessory assembly includes a battery configured to power the second display.

10. The supplemental computing display assembly of claim 8, wherein the accessory assembly includes a USB hub.

11. The supplemental computing display assembly of claim 4, wherein the first housing assembly includes a display housing rail system.

12. The supplemental computing display assembly of claim 11, further comprising a hinge assembly operatively coupled to the second display assembly, the hinge assembly configured to travel along the display housing rail system.

13. The supplemental computing display assembly of claim 12, wherein the hinge assembly is configured to enable the second display assembly to rotate up to about 90-degrees in a forward direction and up to about 180-degrees in a rearward direction.

14. The supplemental computing display assembly of claim 13, wherein the second display assembly further defines a recess along a horizontal edge of the second display assembly, the recess configured to slidably receive the display house rail system, and
   wherein the arm assembly is configured to align with the horizontal edge.

15. A supplemental computing display assembly for selective attachment to a portable computing device having a first display, the supplemental computing display assembly comprising:
   a main housing configured for selective attachment to the portable computing device, the main housing including:
      a first coupling arm tab, the first coupling arm tab configured to mechanically attach the main housing to the portable computing device; and
      two hinge assemblies;
   an arm assembly secured to the main housing; and
   a first display assembly and a second display assembly operatively coupled to the main housing via the respective hinge assembly
   wherein the arm assembly includes:
      a pivot joint configured for orienting the first display between a landscape orientation and a portrait orientation, the pivot joint including:
         a pivot joint column configured to slidably engage the display assembly;
         a spring washer configured to hold the pivot joint within a pivot joint slot of the second display assembly; and
         a retainer head coupled to the pivot joint column and configured to retain the pivot joint column within the pivot joint slot.

16. The supplemental computing display assembly of claim 15, further comprising a kickstand operatively coupled to the main housing, wherein the kickstand is movable between an open position and a closed position.

17. The supplemental computing display assembly of claim 16, wherein the main housing further includes a second coupling arm tab; and
    a gear assembly configured to synchronize movement of the first and second coupling arm tabs.

18. The supplemental computing display assembly of claim 17, wherein a first display assembly is extended and positioned in a portrait orientation when a second display assembly is extended and positioned in a landscape orientation.

19. The supplemental computing display assembly of claim 18, further comprising a second arm assembly configured to operably couple the second display assembly to the main housing.

20. A supplemental computing display assembly for selective attachment to a portable computing device having a first display, the supplemental computing display assembly comprising:
    a main housing configured for selective attachment to the portable computing device;
    a first arm assembly secured to the main housing;
    a second display assembly operatively coupled to the first arm assembly and including a second display configured to communicate with the portable computing device, the second display positionable adjacent to the first display to act as an additional display for the portable computing device when the main housing is attached to the portable computing device, wherein the second display is selectively movable relative to the main housing between a landscape orientation and a portrait orientation,
    a second arm assembly secured to the main housing; and
    a third display assembly operatively coupled to the second arm assembly and including a third display configured to communicate with the portable computing device, the third display positionable adjacent to the first display to act as a third additional display for the portable computing device when the main housing is attached to the portable computing device, wherein the third display is selectively movable relative to the main housing between a landscape orientation and a portrait orientation, independently from the second display assembly,
    wherein the main housing includes a first coupler assembly,
    wherein the second display assembly includes a display housing configured to house the second display, and
    wherein the display housing includes a second coupler assembly configured to couple to a pushpin of a second coupler assembly.

\* \* \* \* \*